(12) United States Patent
Miyawaki

(10) Patent No.: US 10,648,851 B2
(45) Date of Patent: May 12, 2020

(54) LOAD DETECTOR INCLUDING PLACEMENT PLATE AND SLOPE, AND LOAD DETECTION SYSTEM

(71) Applicant: Minebea Mitsumi Inc., Nagano (JP)

(72) Inventor: Shotaro Miyawaki, Koto-ku (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/391,624

(22) Filed: Apr. 23, 2019

(65) Prior Publication Data

US 2019/0250026 A1    Aug. 15, 2019

Related U.S. Application Data

(63) Continuation of application No. PCT/JP2017/037658, filed on Oct. 18, 2017.

(30) Foreign Application Priority Data

Oct. 25, 2016   (JP) .................. 2016-208375

(51) Int. Cl.
*G01G 19/52* (2006.01)
*A61G 7/05* (2006.01)
(Continued)

(52) U.S. Cl.
CPC ............... *G01G 19/52* (2013.01); *A61G 7/05* (2013.01); *A61G 7/0527* (2016.11); *G01G 19/02* (2013.01); *G01G 19/44* (2013.01); *G01G 21/22* (2013.01)

(58) Field of Classification Search
CPC ........ G01G 19/02; G01G 19/52; G01G 19/44; G01G 19/445; G01G 21/22; A61G 7/0527
See application file for complete search history.

(56) References Cited

U.S. PATENT DOCUMENTS 3,961,675 A *  6/1976  Siegel .................. G01G 19/445
                                                    177/126
5,086,856 A *  2/1992  Haggstrom .......... G01G 19/445
                                                    177/1
(Continued)

FOREIGN PATENT DOCUMENTS

CN         2788157 Y      6/2006
CN       101147179 A      3/2008
(Continued)

OTHER PUBLICATIONS

International Search Report for International Application No. PCT/JP2017/037658 dated Dec. 12, 2017.
(Continued)

*Primary Examiner* — Natalie Huls
(74) *Attorney, Agent, or Firm* — Pearne & Gordon LLP

(57) ABSTRACT

There is provided a load detector including, a beam-type load cell which is supported on a support base in a cantilever manner; and a placement part which is connected to the beam-type load cell. The placement part includes a placement plate onto which a subject is to be placed, and a slope which is configured to guide the subject from a floor surface onto the placement plate. A forward end of the slope is swingable about a first perpendicular axis perpendicular to the placement plate or a second perpendicular axis perpendicular to the slope, and/or is movable in a width direction of the placement plate.

11 Claims, 16 Drawing Sheets

(51) Int. Cl.
*G01G 21/22* (2006.01)
*G01G 19/44* (2006.01)
*G01G 19/02* (2006.01)

(56) References Cited

U.S. PATENT DOCUMENTS

| | | | |
|---|---|---|---|
| 5,367,129 A | 11/1994 | Lahl, Jr. | |
| 5,414,225 A * | 5/1995 | Garfinkle | G01G 19/021 |
| | | | 177/127 |
| 6,380,496 B1 * | 4/2002 | Lohkamp | G01G 19/445 |
| | | | 177/144 |
| 6,717,072 B1 * | 4/2004 | Winterberg | G01G 19/445 |
| | | | 177/126 |
| 7,381,910 B1 * | 6/2008 | Wilkerson | G01G 19/445 |
| | | | 177/144 |
| 7,589,288 B2 | 9/2009 | Wu et al. | |
| 7,628,410 B2 | 12/2009 | Fitzgerald et al. | |
| 7,763,813 B2 * | 7/2010 | Domel | G01G 19/44 |
| | | | 177/238 |
| 7,838,782 B2 * | 11/2010 | Hamilton | G01M 1/125 |
| | | | 177/132 |
| 8,279,057 B2 | 10/2012 | Hirose | |
| 10,010,467 B2 * | 7/2018 | Sato | A61G 7/0527 |
| 2008/0105469 A1 * | 5/2008 | Domel | G01G 19/44 |
| | | | 177/25.12 |
| 2008/0272137 A1 | 11/2008 | Fitzgerald et al. | |
| 2009/0051549 A1 | 2/2009 | Tochigi et al. | |
| 2009/0194751 A1 * | 8/2009 | Schmucker | B66F 5/02 |
| | | | 254/8 R |
| 2010/0231376 A1 | 9/2010 | Hirose | |
| 2012/0016631 A1 * | 1/2012 | Coradi | G01G 19/445 |
| | | | 702/173 |
| 2015/0122555 A1 | 5/2015 | Meeks et al. | |
| 2016/0081592 A1 | 3/2016 | Ishikawa et al. | |
| 2019/0015015 A1 | 1/2019 | Sato et al. | |
| 2019/0250027 A1 | 8/2019 | Hatcho et al. | |

FOREIGN PATENT DOCUMENTS

| | | |
|---|---|---|
| CN | 201068294 Y | 6/2008 |
| CN | 201163214 Y | 12/2008 |
| CN | 101472545 A | 7/2009 |
| CN | 105246446 A | 1/2016 |
| DE | 19930414 B4 | 2/2006 |
| JP | 2000-337953 A | 12/2000 |
| JP | 2005-300368 A | 10/2005 |
| JP | 2006-058035 A | 3/2006 |
| JP | 4002905 B2 | 11/2007 |
| JP | 2008-065700 A | 3/2008 |
| JP | 4109230 B2 | 7/2008 |
| JP | 4120094 B2 | 7/2008 |
| JP | 4829020 B | 11/2011 |
| JP | 4879620 B2 | 2/2012 |
| JP | 4943785 B2 | 5/2012 |
| JP | 6082487 B2 | 2/2017 |
| JP | 6097966 B1 | 3/2017 |
| JP | 2017-166987 A | 9/2017 |
| WO | 2006/101275 A1 | 9/2006 |

OTHER PUBLICATIONS

Notification of Reasons for Refusal dated Feb. 6, 2018 for corresponding Japanese Application No. 2016-208375 and English translation.
Written Opinion for International Application No. PCT/JP2017/037658, dated Dec. 26, 2017.
Chinese Office Action dated Sep. 4, 2019 for corresponding Chinese Application No. 201780063590.4 and English translation.

* cited by examiner

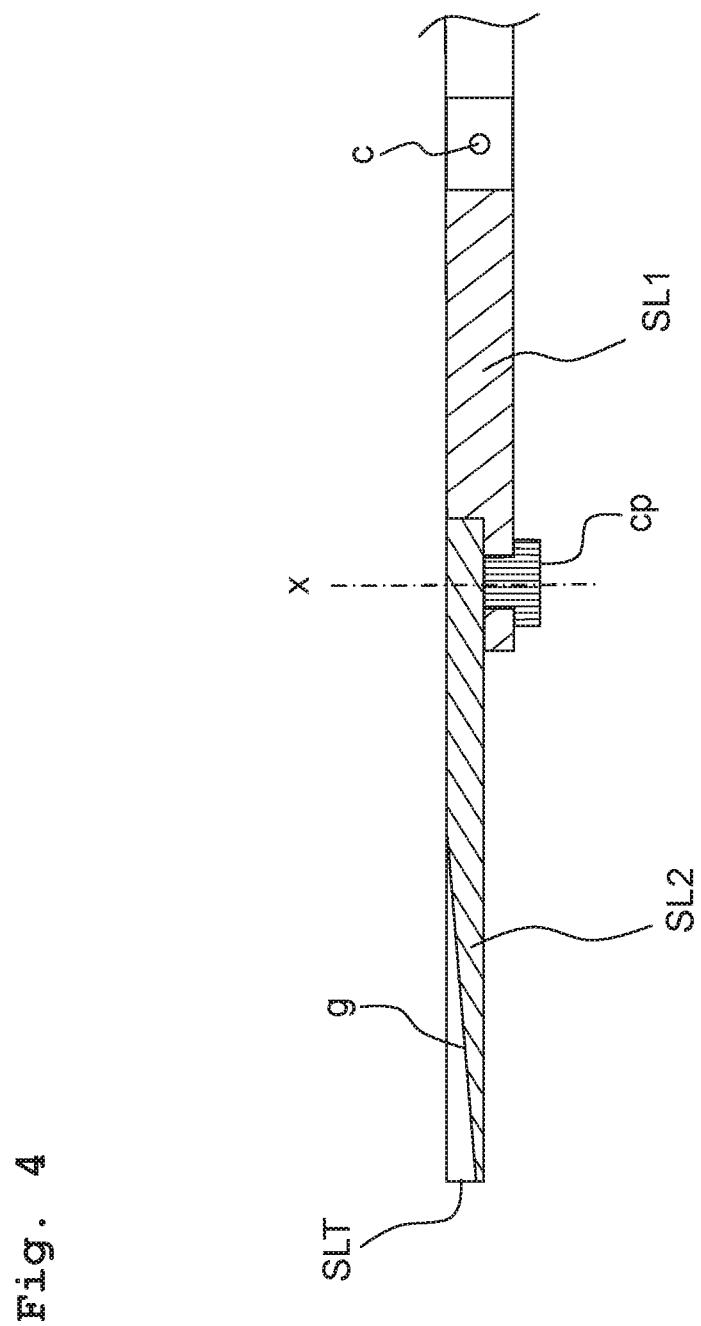

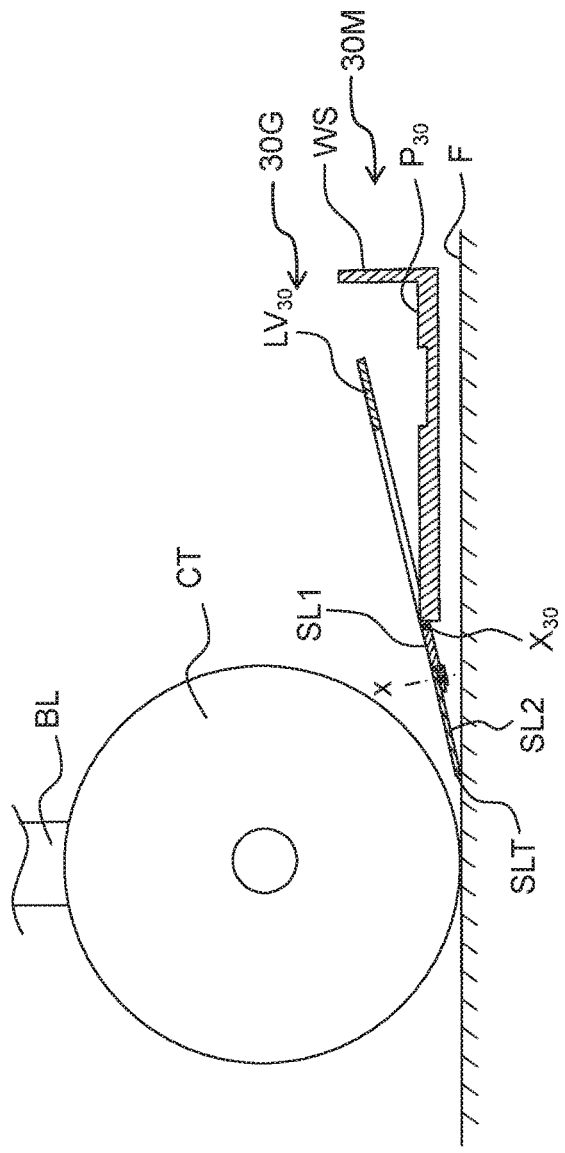
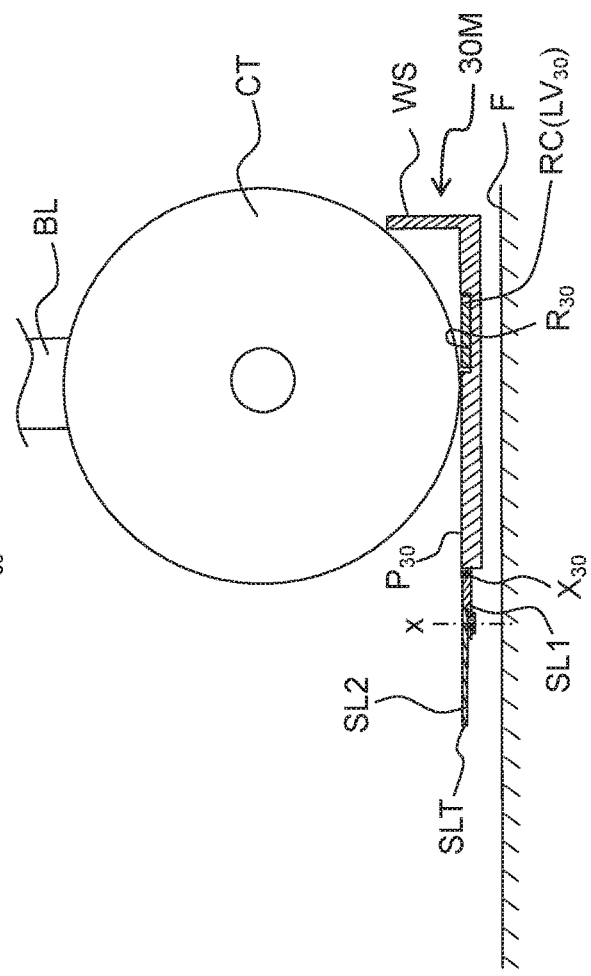
Fig. 5A
Fig. 5B

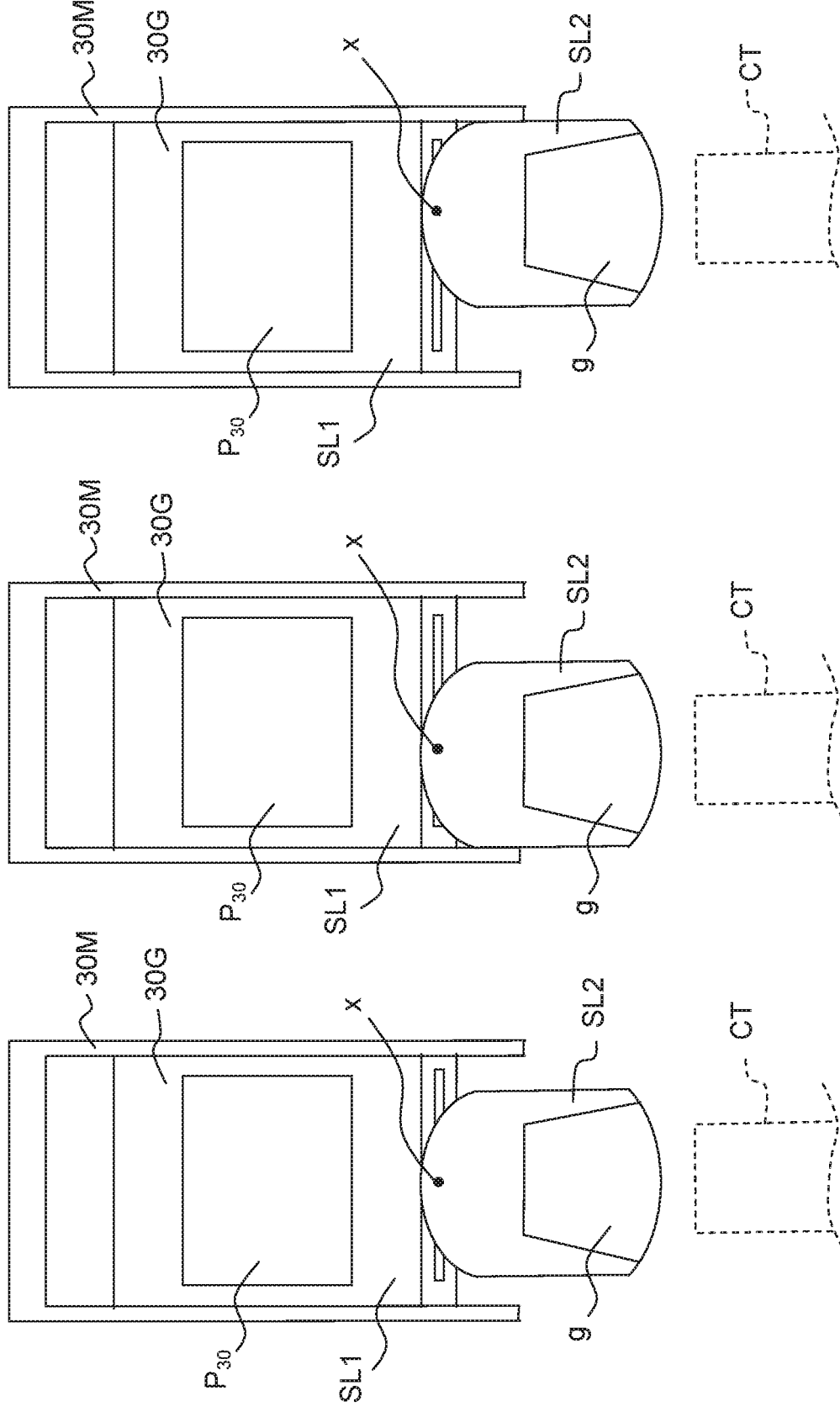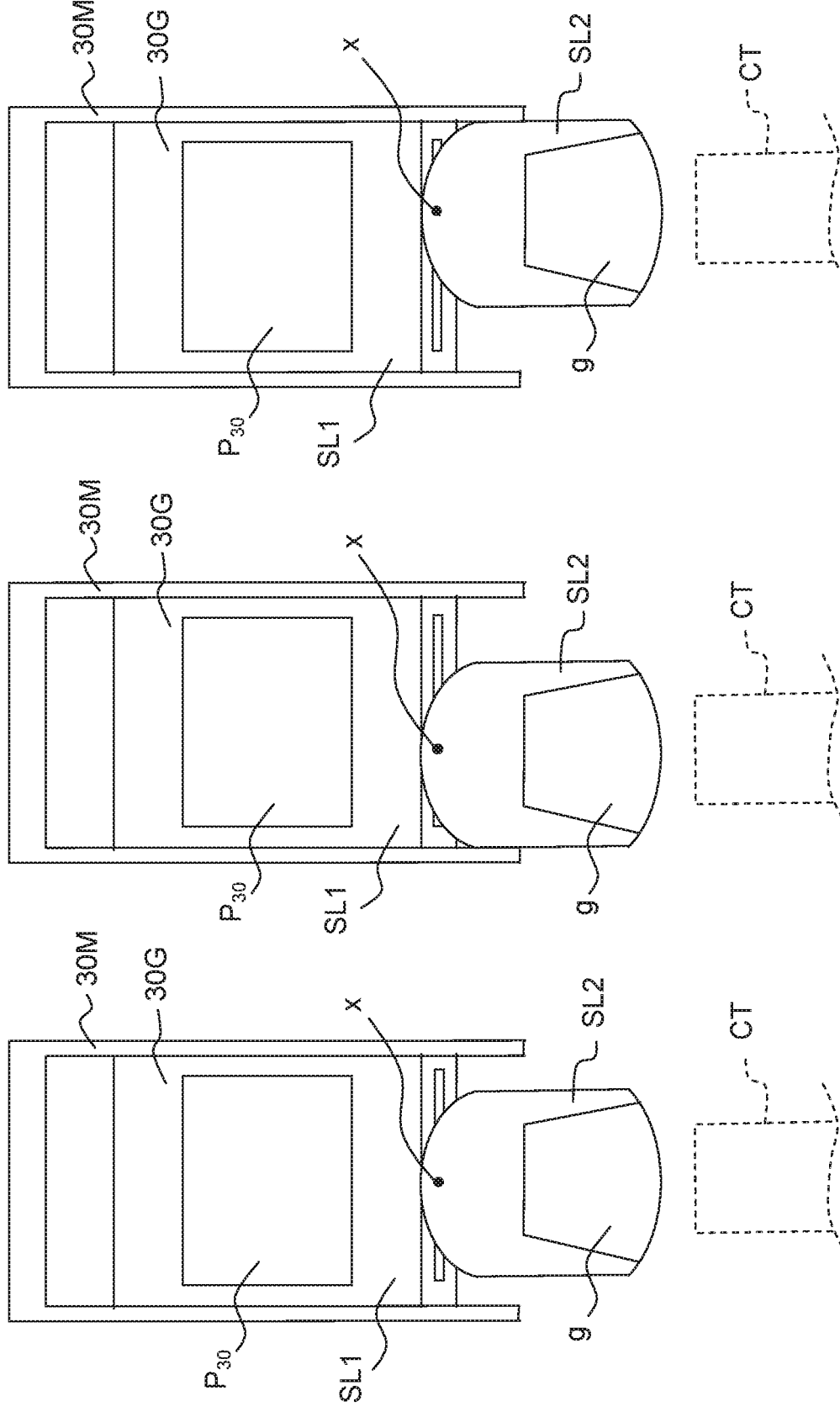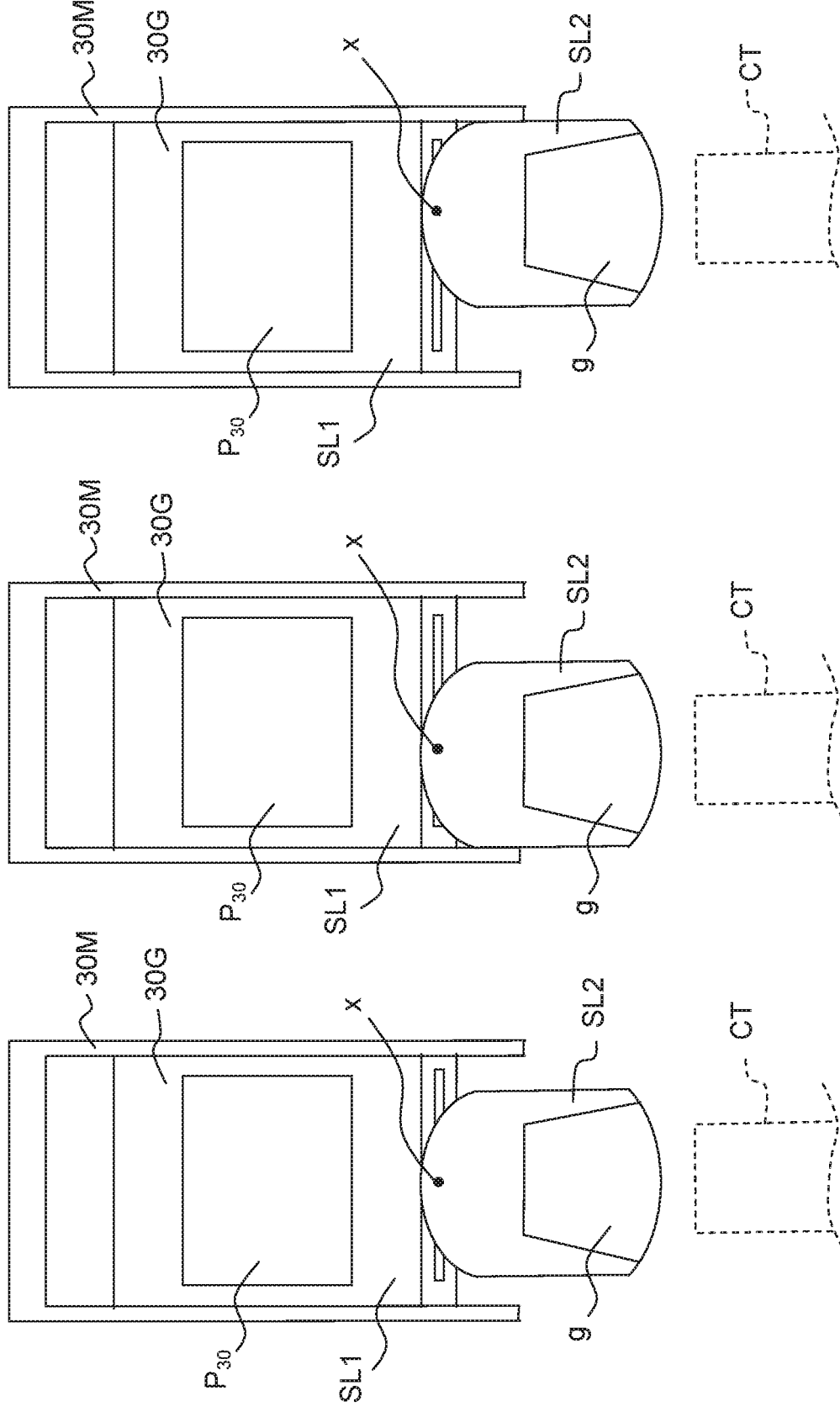

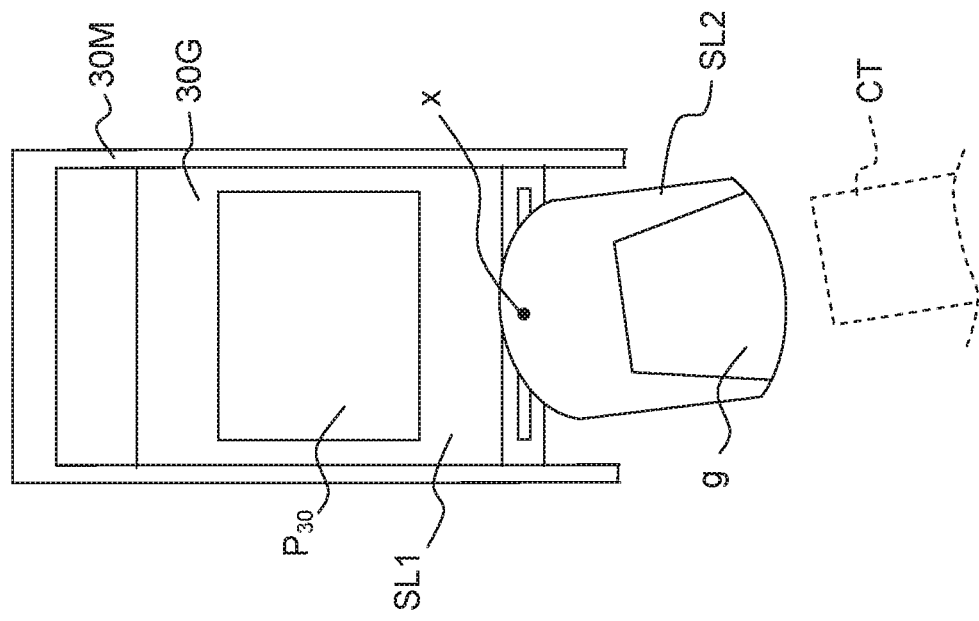
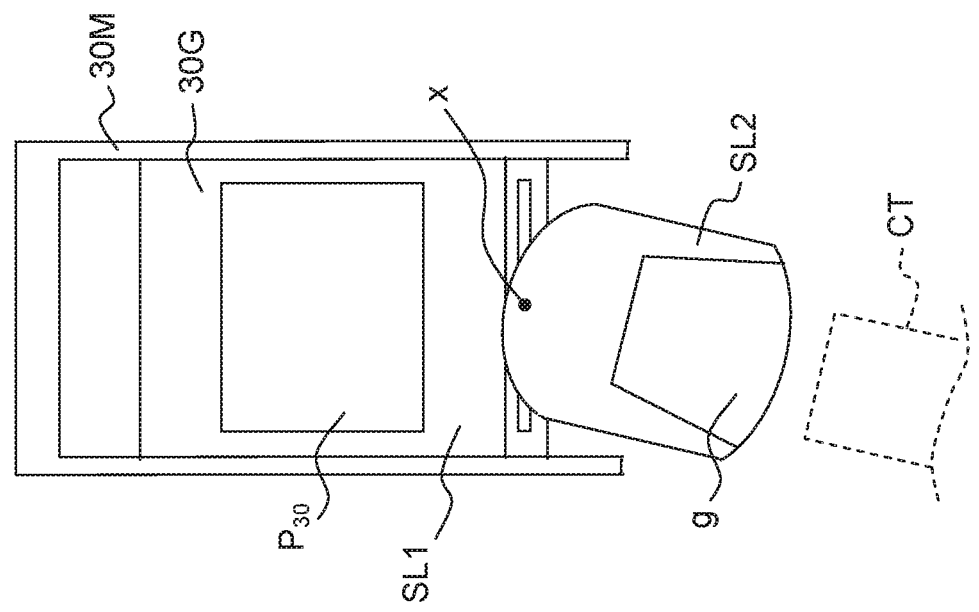

US 10,648,851 B2

LOAD DETECTOR INCLUDING PLACEMENT PLATE AND SLOPE, AND LOAD DETECTION SYSTEM

CROSS-REFERENCE TO RELATED APPLICATIONS

This application is a Continuation Application of International Application No. PCT/JP2017/037658 claiming the conventional priority of Japanese patent Application No. 2016-208375 filed on Oct. 25, 2016, and titled "LOAD DETECTOR AND LOAD DETECTION SYSTEM". The disclosures of Japanese patent Application No. 2016-208375, and International Application No. PCT/JP2017/037658 are incorporated herein by reference in their entirety.

BACKGROUND

The present disclosure relates to a load detector provided with a placement part including a slope, and a load detection system including the load detector.

There is known present-on-bed detection in which a load applied to a bed in hospitals, nursing homes, etc., is detected to determine whether or not a patient or an assisted-living resident is present on the bed. Load detectors which detect the load can be arranged or disposed at various positions; for example, the load detectors can be arranged under support legs, respectively, of a bed.

Japanese Patent No. 4829020 discloses, as the load detector which can be arranged under each leg of a bed, a load detector which includes a cantilever beam having a strain gauge attached thereto, and a placement plate attached to a base end part of the cantilever beam.

SUMMARY

A heavy object, such as a bed, etc., is provided with casters such that the heavy object can be moved without being lifted. However, moving the heavy item with the casters is hardly easy. In particular, it is tiresome to operate four casters provided under the four legs of the bed so that the four casters are simultaneously placed onto placement plates of the load detectors as disclosed in Japanese Patent No. 4829020.

In view of the above situation, an object of the present disclosure is to provide a load detector configured such that a subject can be easily placed on a placement part.

According to a first aspect of the present disclosure, there is provided a load detector including:

a beam-type load cell which is supported on a support base in a cantilever manner; and a placement part which is connected to the beam-type load cell, wherein the placement part includes a placement plate onto which a subject is to be placed, and a slope which is configured to guide the subject from a floor surface onto the placement plate, and a forward end of the slope is swingable about a first perpendicular axis perpendicular to the placement plate or a second perpendicular axis perpendicular to the slope, and/or is movable in a width direction of the placement plate.

According to a second aspect of the present disclosure, there is provided a load detection system configured to detect a load of a human subject on a bed, the system comprising:

a plurality of load detectors each of which is the load detector of the first aspect, each of the plurality of load detectors being disposed in each of the legs of the bed; and a controller which is connected to the plurality of load detectors and which is configured to calculate the load of the human subject based on an output of the load detector.

BRIEF DESCRIPTION OF DRAWINGS

FIG. 4 is a cross-sectional view depicting a slope as depicted in FIG. 3 as seen while being cut across a IV-IV line in FIG. 3.

FIGS. 5A and 5B depict a situation of placing a caster on the placement part, wherein FIG. 5A depicts a situation before the caster is placed on the placement part, and FIG. 5B depicts a situation after the caster has been placed on the placement part.

FIGS. 6A, 6B and 6C are each a view depicting a situation wherein a second plate part of the slope linearly moves in a width direction.

FIGS. 7A and 7B are each a view depicting a situation wherein the second plate part of the slope swings (pivots).

DESCRIPTION OF EMBODIMENTS

First Embodiment

An explanation will be given about a load detector 100 of a first embodiment of the present disclosure, with reference to FIGS. 1 to 15. In the first embodiment, the load detector 100 is a load detector which is arranged at a position below a leg BL (FIGS. 5A and 5B) of a bed and which detects load of a human subject (subject) on the bed.

Figure 1:
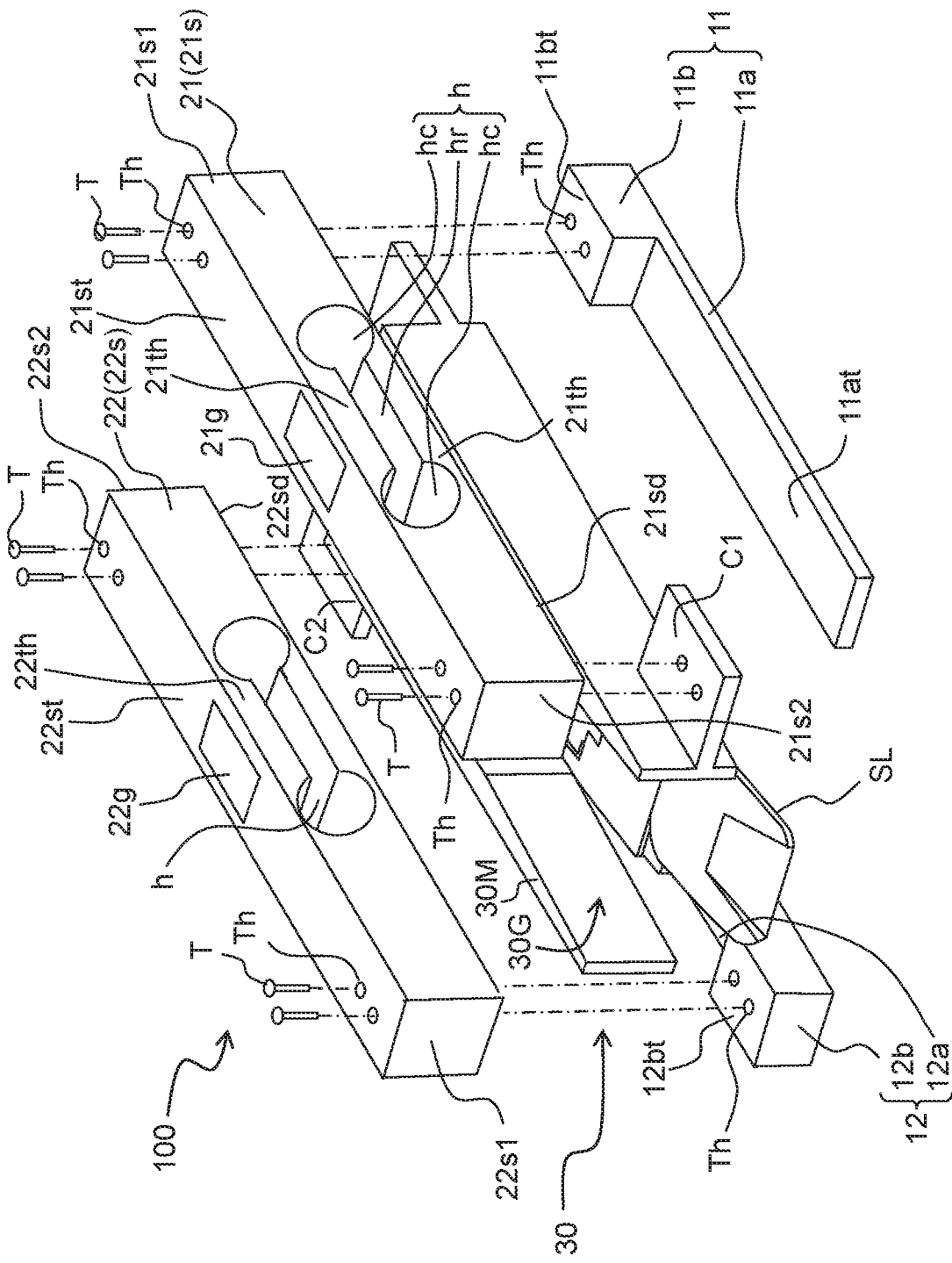
FIG. 1 is an exploded perspective view of a load detector according to a first embodiment of the present disclosure.
Figure 2:
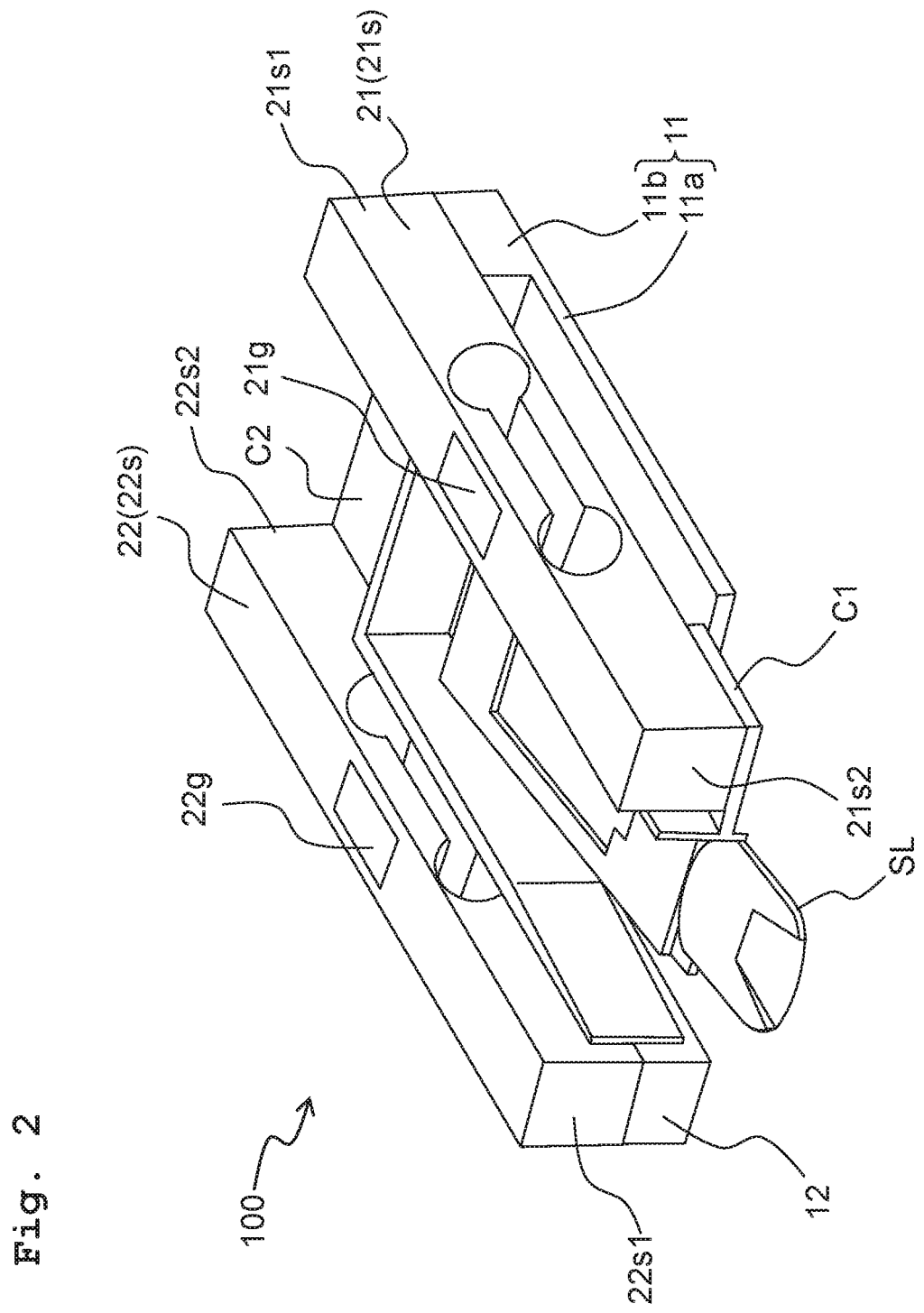
FIG. 2 is a perspective view of the load detector according to the first embodiment of the present disclosure.

As depicted in FIGS. 1 and 2, the load detector 100 mainly includes a first base 11, a second base 12, a first load cell 21 of a beam type which is connected to the first base 11, a second load cell 22 of a beam type which is connected to the second base 12, and a placement part (mounting part) 30 which is provided with a slope SL and which is supported by the first and second load cells 21, 22 to be positioned therebetween. In the following explanation, a direction in which beams of the beam-type first and second load cells 21, 22 extend is defined as a front-rear direction of the load detector 100, and a side on which the slope SL of the placement part 30 is located is defined as the front side of the load detector 100. Further, a direction in which the beams of the first and second load cells 21 and 22 face (are opposite to) each other is defined as a width direction of the load detector 100. A surface on which the load detector 100 is placed or installed is referred to as a floor surface (floor).

The first base 11 is a member disposed on the floor surface to support the first load cell 21 in a cantilever manner. The first base 11 includes a flat plate 11a, of which planar shape is a rectangle substantially same with the planer shape of the first load cell 21, and a support base part (a support base) 11b which protrudes or extends upward from an end of the flat plate 11a. Accordingly, a top surface 11bt of the support base part 11b is positioned above a top surface 11at of the flat plate 11a.

The top surface 11bt of the support base part 11b is formed with two screw holes Th. The first load cell 21 is fixed to the support base part 11b via screws T and the screw holes Th.

The second base 12, which has the same shape as the first base 11, includes a flat plate 12a and a support base part (a support base) 12b. The second base 12 is arranged to face the first base 11 (to be parallel to the first base 11 in the first embodiment), with a predetermined distance intervening therebetween; however, the support base part 11b of the first base 11 is arranged to face a side opposite to the side which the support base part 12b is arranged to face. Namely, a location at which the support base part 11b is connected to the flat plate 11a of the first base 11 and a location at which the support base part 12b is connected to the flat plate 12a of the second base 12 are on mutually opposite sides. The second load cell 22 is fixed to the support base part 12b via screws T and screw holes Th formed in the top surface 12bt of the support base part 12b.

The first load cell 21, which is a beam-type load cell, includes a flexure element (strain body) 21s in a rectangular column shape which has a through hole h, and a strain gauge 21g attached to the flexure element 21s. The first load cell 21 detects the strain or distortion generated in the flexure element 21s as the change in a resistance value of the strain gauge 21g, thereby detecting the load applied to the first load cell 21.

The flexure element 21s is an elongated (long) square pillar made of metal such as aluminum, iron, etc. The through hole h, which passes through the flexure element 21s in the width direction, is formed in a central portion in the longitudinal direction of the flexure element 21s. The through hole h includes two circular holes hc and a rectangular hole hr. Each of the circular holes he has a circular cross-sectional shape, and the rectangular hole hr, which has a substantially rectangular cross-sectional shape, connects the two circular holes hc to each other in the longitudinal direction. Thin parts 21th which are thinner in the up-down direction due to existence of the through hole h are defined respectively in portions or parts, of the flexure element 21s, located on the upper and lower sides of the through hole h.

A rear end of the flexure element 21s is fixed to the support base part 11b of the first base 11 via screw holes Th which are disposed in the vicinity of the rear end and screws T. This allows the flexure element 21s to be supported by the first base 11 (support base part 11b) in a cantilever manner, with the rear end of the flexure element 21s as a fixed end 21s1 and a front end of the flexure element 21s as a free end 21s2.

The placement part 30 is fixed to a lower surface 21sd, of the flexure element 21s, at a part or portion thereof in the vicinity of the free end 21s2 of the flexure element 21s via screws T and screw holes Th. Namely, the flexure element 21s (first load cell 21) supports the placement part 30 in the vicinity of the free end 21s2 so that the placement part 30 is movable in the up-down direction.

The strain gauge 21g is provided as strain gauges 21g which are attached to the flexure element 21s such that one of the strain gauges 21g is attached to an upper surface 21st of the flexure element 21s and the other of the strain gauges 21g is attached to the lower surface 21sd of the flexure element 21s, at a substantially central portion in the longitudinal direction of the flexure element 21s. Further, the strain gauges 21g are connected to an external controller via unillustrated lead wires.

The second load cell 22, which has the same structure as the first load cell 21, includes a flexure element (strain body) 22s in a rectangular column-shape and two strain gauges 22g. The flexure element 22s includes a through hole h passing through a central portion of the flexure element 22s in the width direction. The strain gauges 22g are attached respectively to thin parts 22th of the flexure element 22s. The second load cell 22 is arranged to face the first load cell 21 (to be parallel to the first load cell 21 in first embodiment) with a predetermined distance intervening therebetween.

A front end of the flexure element 22s is fixed to the support base part 12b of the second base 12 via screw holes Th provided in the front end and screws T. This allows the flexure element 22s to be supported by the second base 12 (support base part 12b) in a cantilever manner, with the front end of the flexure element 22s as a fixed end 22s1 and a rear end of the flexure element 22s as a free end 22s2.

Two screw holes Th passing through the flexure element 22s in the up-down direction are formed also in the vicinity of the free end 22s2 of the flexure element 22s. The placement part 30 is fixed to a lower surface 22sd, of the flexure element 22s, at a part or portion thereof in the vicinity of the free end 22s2 via screws T and the screw holes Th. Namely, the flexure element 22s (second load cell 22) supports the placement part 30 in the vicinity of the free end 22s2 so that the placement part 30 is movable in the up-down direction. In view of the arrangement relationship between the flexure element 21s and the flexure element 22s, the fixed end 22s1 of the flexure element 22s is in the same position, in the front-rear direction of the load detector 100, as the free end 21s2 of the flexure element 21s of the load cell 21, and the free end 22s2 of the flexure element 22s is in the same position, in the front-rear direction of the load detector 100, as the fixed end 21s1 of the flexure element 21s of the load cell 21. Namely, although the flexure element 21s and the flexure element 22s extend in the same direction while facing each other, an orientation of the free end relative to the fixed end is mutually opposite (reverse) between the flexure element 21s and the flexure element 22s. Further, the support base part 11b supporting the flexure element 21s is in substantially the same position as the free end 22s2 of the flexure element 22s in the front-rear direction, and the support base part 12b supporting the flexure element 22s is in substantially the same position as the free end 21s2 of the flexure element 2 is in the front-rear direction.

Figure 3:
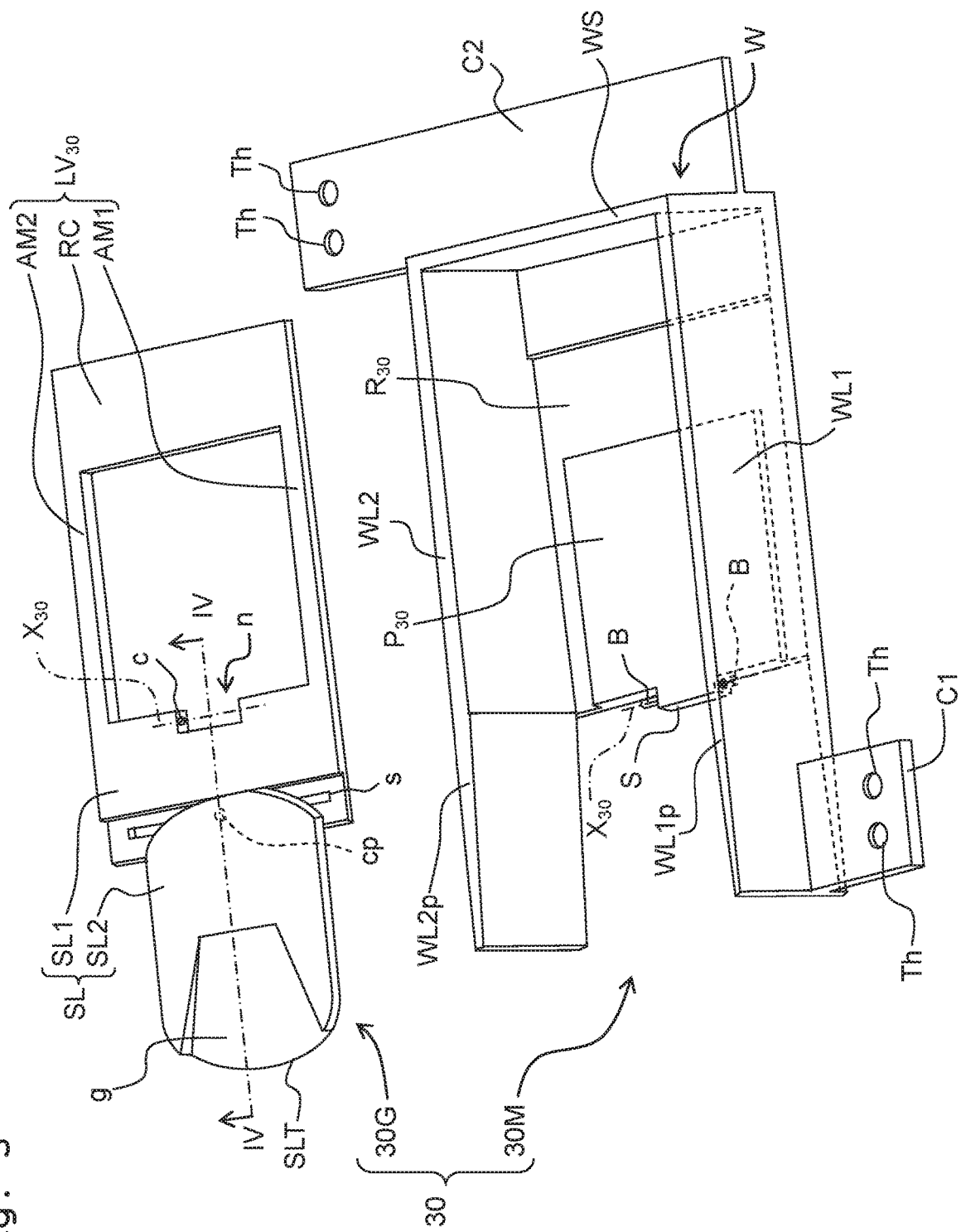
FIG. 3 is an exploded perspective view of a placement part included in the load detector according to the first embodiment of the present disclosure.

The placement part 30 is a measurement pan on which a subject such as the caster CT, etc., is placed, in a case that the load is to be detected by using the load detector 100. As depicted in FIG. 3, the placement part 30 includes a main body 30M and a guide 30G which is attached to the main body 30M so that the guide 30G is swingable (swingably movable) or pivotable (pivotally movable) with respect to the main body 30M.

The main body 30M includes a rectangular plate (placement plate) $P_{30}$ on which the subject is placed, a wall W surrounding the plate $P_{30}$ in three directions therearound, and a first connection part C1 and a second connection part C2 which are provided in the wall W. A side, on which a subject (detection target) as described below is placed relative to the plate $P_{30}$, is defined as the upper side of the main body 30M and the plate $P_{30}$ (above the main body 30M and the plate $P_{30}$); an opposite side opposite to the upper side is defined as the lower side of the main body 30M and the plate $P_{30}$ (below the main body 30M and the plate $P_{30}$).

A recess $R_{30}$, which has substantially a C-shape (substantially a U-shape) in plan view, is provided in the upper surface of the plate $P_{30}$. The recess $R_{30}$ is formed so that an opening portion of the C-shape (U-shape) is positioned, in the plan view, on one side in the long-side direction of the plate $P_{30}$ (on a side wherein the wall W is not present).

One short side, included in a pair of short sides of the plate $P_{30}$, in which the wall W is not present is provided with an axis support part S which has a rectangular parallelepiped shape and is disposed at a central portion of the short side. The axis support part S is provided with bosses B protruding toward both sides in the short-side direction of the plate $P_{30}$.

The wall W, which is arranged such that the wall W is perpendicular (orthogonal) to the plate $P_{30}$, includes a first long wall WL1 extending along one of the long sides of the plate $P_{30}$, a second long wall WL2 extending along the other of the long sides of the plate $P_{30}$, and a short wall WS extending along one of the short sides of the plate $P_{30}$ and connecting the first long wall WL1 and the second long wall WL2.

Ends, of the first and second long walls WL1 and WL2 opposite to ends connected to the short wall WS, protrude beyond the plate $P_{30}$. In the following description, a protruding portion of the first long wall WL1 is referred to as a first protrusion WL1p, and a protruding portion of the second long wall WL2 is referred to as a second protrusion WL2p.

A first connection part C1, which has a plate-like shape and is parallel to the plate $P_{30}$, is provided on the outer surface, of the first protrusion WL1p, facing a side opposite to the side on which the plate $P_{30}$ is positioned. The first connection part C1 is fixed to the lower surface 21sd of the flexure element 21s of the first load cell 21 in the vicinity of the free end 21s2 of the flexure element 21s via screws T and screw holes Th (FIGS. 1 and 2).

A second connection part C2 having a plate-like shape and being parallel to the plate $P_{30}$ is provided on the outer surface, of the short wall WS, facing a side opposite to the side on which the plate $P_{30}$ is positioned. The second connection part C2 has a rectangular shape of which longitudinal direction is the extending direction of the short wall WS. An end in the longitudinal direction of the second connection part C2 is a protruding portion protruding beyond the second long wall WL2. The second connection part C2 is fixed to the lower surface 22sd of the flexure element 22s of the second load cell 22 in the vicinity of the free end 22s2 of the flexure element 22s via screws T and screw holes Th provided on the protruding portion (FIGS. 1 and 2).

Figure 8:
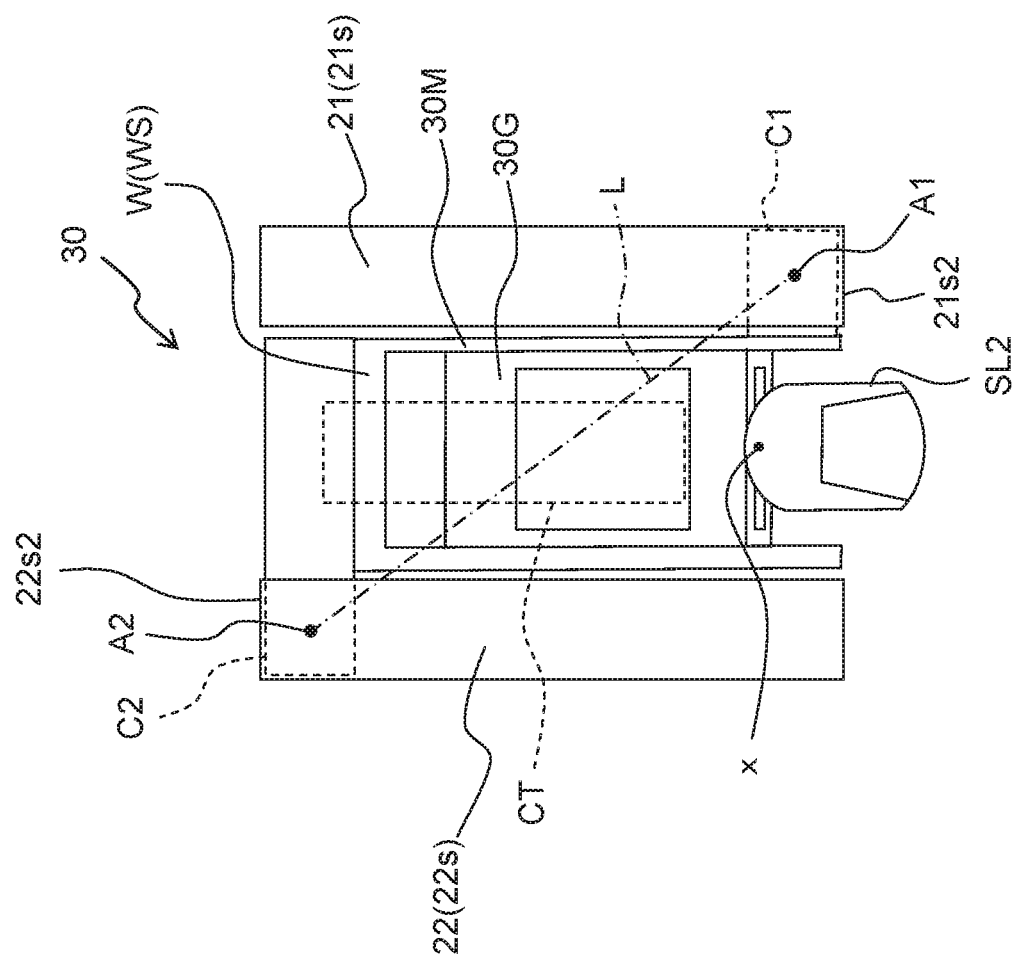
FIG. 8 is an illustrative view illustrating the relationship between an attachment position at which the placement part is attached to load cells and a suitable placing position of subject on the placement part.

As depicted in FIG. 8, the short wall WS is arranged such that the center of gravity of the caster CT (in FIG. 8, the caster CT is depicted as a cross-sectional shape thereof by a horizontal plane including the axis of rotation thereof), which is brought into contact with the short wall WS and is placed on the plate $P_{30}$, is positioned on a line L or in the vicinity thereof, the line L connecting a connection center point A1 of the connection of the first connection part C1 to the first load cell 21 and a connection center point A2 of the connection of the second connection part C2 to the second load cell 22. The reason for such an arrangement will be described later on.

The guide 30G includes a slope SL which guides the caster CT on the floor surface onto the plate $P_{30}$, and a lever $LV_{30}$ which extends from the slope SL to a side opposite to a forward end SLT of the slope SL. The slope SL includes a first plate part SL1 which has a rectangular shape, and a second plate part SL2 which is provided on (at) one side in a short side-direction of the first plate part SL1.

The first plate part SL1 is a flat plate of which one end in the short side direction is formed as a thinned portion, and is formed, for example, of a metal. The thinned portion is formed with a slit s extending in the long-side direction of the first plate part SL1. The first plate part SL1 is provided with, on the other side in the short side direction thereof, a notch n which has a rectangular shape in plan view. A pair of surfaces facing each other and defining the notch n respectively are provided with recessed holes c.

The second plate part SL2 is substantially elliptic-shaped (oval-shaped) flat plate defined by a pair of linear edge portions extending parallel to each other and a pair of curved edge portions connecting, respectively, ends of the pair of linear edge portions; the second plate part SL2 is formed, for example, of a metal. The upper surface of the second plate part SL2 is provided with a guide groove g extending from one to the other of the pair of curved edge portions. The depth and width of the guide groove g is made smaller as approaching closer, from the one toward the other of the pair of curved edge portions.

As depicted in FIGS. 3 and 4, the second plate part SL2 is connected to the first plate part SL1 such that the second plate part SL2 is movable with respect to the first plate part SL1, at a central portion in a facing direction in which the pair of linear edge portions face each other and in the vicinity of one of the curved edge portions which is not provided with the guide groove g, via a connecting pin cp made of a metal and attached to the lower surface of the second plate part SL2 and via the slit s of the first plate part SL1. The slope SL which guides the subject, such as the caster CT, etc., onto the plate $P_{30}$ is constructed of the first plate part SL1 and the second plate part SL2 which are connected to each other in the above-described manner; the other of the curved edge portions, of the second plate SL2, which is provided with the guide groove g is made to be (allowed to serve as) the forward end SLT of the slope SL. Although the forward end SLT is located on the front side relative to (in front of) forward ends of the first and second protrusions WL1p and WL2p, there is no limitation to this. It is allowable to arrange an area, of the upper surface of the first plate SL1, which is not thinned, to be flush with the upper surface of the second plate part SL2.

By allowing the connecting pin cp to slidably move along the slit s, the second plate part SL2 and the forward end SLT can be moved linearly along the long-side direction of the first plate part SL1 (in the width direction of the load detector 100 and of the plate $P_{30}$). Further, by allowing the connecting pin cp to rotate about a central axis x (FIG. 4) of the connecting pin cp, the second plate part SL2 and the forward end SLT can be swung about a central axis (second perpendicular axis) x which is perpendicular to the first plate part SL1.

The lever $LV_{30}$ includes a first arm AM1 and a second arm AM2 each connected to one of both ends of the long side, of the first plate part SL1 of the slope SL, which is provided with the notch n, and a rectangular part (contact part) RC which is connected to the first arm AM1 and the second arm AM2, on a side opposite to the slope SL. The lever $LV_{30}$ has substantially a C-shape (U-shape) in plan view.

The bosses B of the axis support part S of the plate $P_{30}$ are fitted respectively into the recessed holes c of the notch n of the slope SL to thereby allow the guide 30G to be connected to the main body 30M so that the guide 30G is swingable (pivotable), with respect to the main body 30M, about a swing axis $X_{30}$ connecting the bosses B and the recessed holes c. The guide 30G is configured so that the front side of the recessed holes c (a side closer to the forward end SLT) is heavier than the rear side of the recessed holes c (a side closer to the lever $LV_{30}$), by configuring the slope SL to be heavier than the lever $LV_{30}$. Due to this configuration, as long as no load is applied to the lever $LV_{30}$, the guide 30G rotates or pivots, with the swing axis $X_{30}$ as the center of rotation, in a direction in which the forward end SLT moves downward (is lowered), thereby allowing the forward end SLT to make contact with the floor surface. Note that, instead of the configuration in which the slope SL side is heavier than the lever $LV_{30}$ side, it is allowable to provide a mechanism which urges (biases) the forward end SLT toward the floor surface, by means of a spring, a magnet, etc.

The shape in plan view of the recess $R_{30}$ provided on the plate $P_{30}$ of the main body 30M is substantially the same as the shape in plan view of the lever $LV_{30}$ of the guide 30G. Accordingly, in a case that the guide 30G swings (pivots) relative to the main body 30M to thereby cause the lever $LV_{30}$ of the guide 30G to make contact with the plate $P_{30}$ of the main body 30M, the lever $LV_{30}$ is arranged in the recess $R_{30}$ (FIG. 5B). In this situation, it is also allowable to make the upper surface of the lever $LV_{30}$ be flush with the upper surface of the plate $P_{30}$.

Next, an explanation will be given about a method of using the load detector 100, regarding such a case, as an example, that the detection target is a human subject on a bed and that a cater CT, for moving the bed, which is attached to a lower end of the leg BL (FIGS. 5A and 5B) of the bed is placed on the placement part 30. Note that in this case, the caster CT is also the detection target (subject).

In a case of performing the load detection by using the load detector 100, at first, the caster CT is placed on the plate $P_{30}$ of the main body 30M of the placement part 30. In a state that the caster CT is not placed on the plate $P_{30}$ (FIG. 5A), the forward end SLT of the slope SL is in a first position at which the forward end SLT is brought into contact with a floor surface F due to the self-weight of the slope SL.

In this state, the caster CT located on the front side relative to the placement part 30 is moved onto the plate $P_{30}$ by using the guide 30G. Here, in a case that the caster CT is located at a substantially central portion in the width direction of the plate $P_{30}$, it is possible to easily place the caster CT on the plate $P_{30}$ only by allowing the caster CT to roll from the front side toward the rear side, as depicted in FIG. 6A. On the other hand, in such a case that the caster CT is shifted or deviated to one side in the width direction of the plate $P_{30}$, the second plate part SL2 of the slope SL is allowed to slide in the width direction to thereby align the guide groove g with respect to the caster CT, as depicted in FIGS. 6B and 6C. Afterwards, it is possible to easily place the caster CT on the plate $P_{30}$ only by allowing the caster CT to roll from the front side toward the rear side. By making the second plate part SL2 to be slidably movable in the width direction in the above-described manner, it is possible to easily align the guide groove g with respect to the caster CT. Further, by allowing the second plate part SL2 to be slidably movable in the width direction, it is possible to made the width of the second plate part SL2 itself to be small, which consequently in turn makes it possible to reduce the size of the load detector 100 as a whole (there would be no need to make the load detector 100 to be unnecessarily large).

Further, there is also such a case that an advancing direction in which the caster CT advances or moves is not coincident with the front-rear direction. In such a case, as depicted in FIGS. 7A and 7B, the second plate part SL2 is swung about the axis x so as to make an extending direction in which the guide groove g extends to be matched with (coincident with) the advancing direction of the caster CT, and then the caster CT is caused to roll toward the guide groove g. By gradually changing the advancing direction of the caster CT while the caster CT is rolling on the slope SL, it is possible to place the caster CT easily on the plate $P_{30}$.

Since there is not any difference in the height between the floor surface F and the forward end SLT, the caster CT is capable of easily running up onto the second plate part SL2, and is capable of moving obliquely upward along the second plate part SL2 while being guided in the width direction by the guide groove g. Then, the caster CT passes the upper surface of the first plate part SL1, and is capable of reaching the front end of the plate $P_{30}$ of the main body 30M, namely, a position on the swing axis $X_{30}$. So far, there is no change in the posture of the guide 30G.

Subsequently, in a case that the caster CT which has reached the front end of the plate $P_{30}$ (i.e., the position on the swing axis $X_{30}$) passes beyond the swing axis $X_{30}$ and moves toward the short wall WS, the caster CT runs up onto the rectangular part RC of the lever $LV_{30}$ of the guide 30G, and pushes the rectangular part RC downward. This causes the guide 30G to swing about the swing axis $X_{30}$ as the center, which in turn causes the lever $LV_{30}$ of the guide 30G to be accommodated or to fit in the recess $R_{30}$ of the plate $P_{30}$ of the main body 30M (FIG. 5B). The caster CT stops at the timing at which the caster CT comes into contact with the short wall WS, thereby ending the placement of the caster CT.

In the above-described state, the forward end SLT of the slope SL has swung to a second position at which the forward end SLT is separated away from the floor surface. In the second position, the entirety of the slope SL is separated away from the floor surface. Further, a flat surface is defined by the upper surface of the plate $P_{30}$ and the upper surface of the lever $LV_{30}$; since the caster CT is positioned on the flat surface, there is no such a fear of, for example, a measurement error, which might otherwise be caused by any movement of the caster CT due to any height difference between the upper surface of the plate $P_{30}$ and the upper surface of the rectangular part RC. Note that in order to prevent any rolling motion or rotational movement of the caster CT, the caster CT may be locked after being placed on the placement part 30.

The load of a human subject on the bed is transmitted to the flexure element 21s of the first load cell 21 and the flexure element 22s of the second load cell 22 which support the placement part 30, via the bed leg BL, the caster CT, and the placement part 30. The load transmitted to the flexure element 21s and the flexure element 22s generates the strain in the flexure element 21s and the flexure element 22s, and the strain gauges 21g, 22g each detect the strain as the change in a resistance value. The detected change in the resistance value is outputted, via a lead wire (not depicted in the drawing), to the controller (not depicted in the drawing) which is provided outside the load detector 100, or provided in the first base 11 or the second base 12. The controller performs an arithmetic processing to thereby make it possible to determine the load of the human subject.

Here, an explanation will be given about the reason for supporting the placement part 30 in the load detector 100 of the first embodiment, at two points by using the first load cell 21 and the second load cell 22.

In the load detector 100 of the present embodiment, as depicted in FIG. 8, the main body 30M of the placement part 30 is supported in the vicinity of the free end 21s2 of the flexure element 21s of the first load cell 21 via the first connection part C1, and is supported in the vicinity of the free end 22s2 of the flexure element 22s of the second load cell 22 via the second connection part C2, such that the main body 30M is movable in the up-down direction; and the main body 30M of the placement part 30 is least likely to bend on the line L connecting the connection center point A1 and the connection center point A2 in the shortest distance. Thus, by arranging the caster CT of the bed on the line L, it is possible to detect the load of the human subject on the bed in a state that the effect due to the bending of the placement part 30 is suppressed.

As described above, in the load detector 100 according to the present embodiment, the short wall WS of the main body 30M of the placement part 30 is arranged such that the center of gravity of the caster CT brought into contact with the short wall WS is positioned on the line L or in the vicinity thereof. Thus, it is possible to detect the load of the human subject stably and precisely by stably arranging the caster CT on the line L or in the vicinity thereof.

Figure 9:
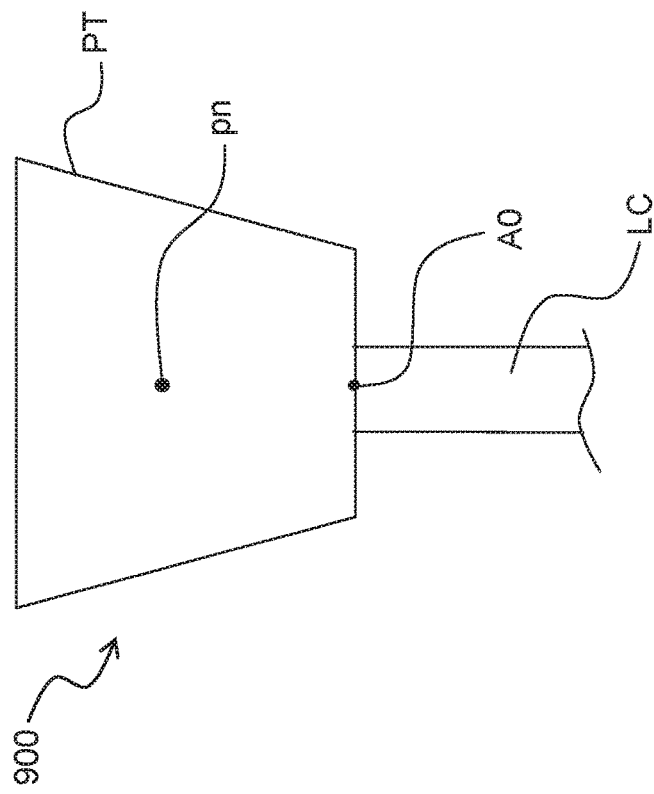
FIG. 9 is an illustrative view illustrating a placing position at which a subject is placed on a placement plate in a load detector using a single beam-type load cell.

The load detector 100 of the present disclosure can perform the load detection more stably and accurately than a load detector in which a placement plate is attached to an end of one piece of a beam-type load cell (hereinafter referred to as a single-load-cell-type load detector). The reason thereof will be explained while referring to a single-load-cell-type load detector 900 depicted in FIG. 9. In the single-load-cell-type load detector 900 wherein a placement plate PT is attached to an end of a beam-type load cell LC as depicted in FIG. 9, the position deviation error (eccentric error) (detection error generated depending on the placement position of the subject on the placement plate) is relatively small in a case that a placement position pn of a detection target is in the vicinity of a connection position A0 between the beam-type load cell LC and the placement plate PT, whereas the position deviation error becomes greater as the placement position pn is separated further away from the connection position A0. The reason thereof is as follows: namely, as the placement position pn is separated further away from the connection position A0 in the longitudinal direction of the beam-type load cell LC with a separation distance, the bending moment of which degree depends on the separation distance and which is about an axis extending in the width direction of the beam-type load cell LC acts on a flexure element of the beam-type load cell LC, to thereby cause the strain in the flexure element. This strain causes the position deviation error in the strain gauge of the beam-type load cell LC. Further, as the placement position pn is separated further away from the connection position A0 in the width direction of the beam-type load cell LC with a separation distance, the torsional or twisting moment of which degree depends on the separation distance and which is around an axis extending in the longitudinal direction of the beam-type load cell LC acts on the flexure element of the beam-type load cell LC, to thereby cause the strain in the flexure element. This strain causes the position deviation error in the strain gauge of the beam-type load cell LC.

Figure 10:
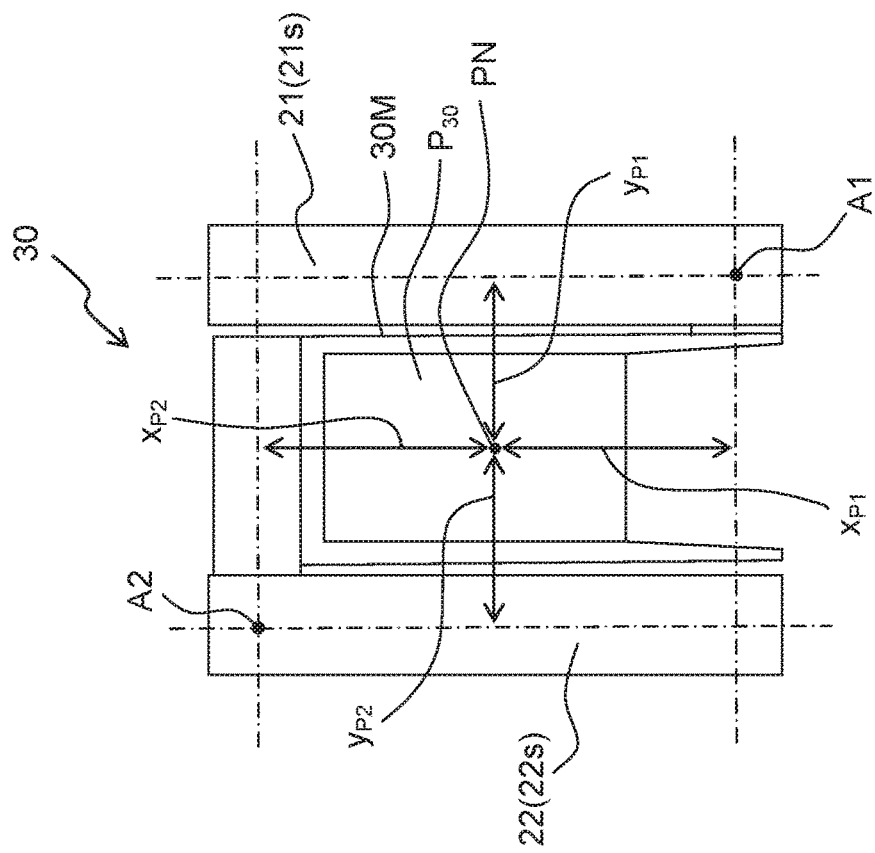
FIG. 10 is an illustrative view illustrating distances, in a front-rear direction and the width direction, between a position of a subject placed on the placement part and the attachment position at which the placement part is attached to the load cells.

In contrast, in the load detector 100 of the present embodiment, provided that a distance in the longitudinal direction between the connection center point A1 and a placing position PN of the detection target placed on the plate P$_{30}$ of the main body 30M of the placement part 30 is defined as a distance X$_{P1}$, and that a distance, in the longitudinal direction between the connection center point A2 and the placing position PN is defined as a distance X$_{P2}$ as depicted in FIG. 10, then the total of the distances x$_{P1}$, x$_{P2}$ is constant over substantially the entire area of the plate P$_{30}$ of the main body 30M. Thus, even in such a case that the placement position PN is moved or displaced in the front-rear direction in the load detector 100 of the present embodiment, the total of the position deviation error caused in the first load cell 21 by the bending moment and the position deviation error caused in the second load cell 22 by the bending moment is approximately constant (a value having a predetermined ratio to the weight of the detection target) at all times. Therefore, the load of the detection target can be detected stably in a state that the effect of the position deviation error caused by the bending moment is substantially removed, for example, by allowing the controller (not depicted in the drawings) to perform, for example, a processing of summing up detection values of the first load cell 21 and the second load cell 22 and subtracting a value having a constant ratio to the detection values from the summed detection values, as the position deviation error.

Further, provided that a distance in the width direction between the connection center point A1 and the placing position PN of the detection target placed on the plate P$_{30}$ of the main body 30M is defined as a distance y$_{P1}$, and that a distance in the width direction between the connection center point A2 and the placing position PN is defined as a distance y$_{P2}$ as depicted in FIG. 10, then the total of the distances y$_{P1}$, y$_{P2}$ is constant over substantially the entire area of the plate P$_{30}$ of the main body 30M. Thus, even in such a case that the placing position PN is displaced in the width direction in the load detector 100 of the present embodiment, the total of the position deviation error caused in the first load cell 21 by the torsional moment and the position deviation error caused in the second load cell 22 by the torsional moment is approximately constant (a value having a predetermined ratio to the weight of the detection target) at all times. Therefore, the load of the detection target can be detected stably in a state that the effect of the position deviation error caused by the torsional moment is substantially removed by performing a processing similar to the processing which is performed regarding the case of the bending moment.

Effects of the load detector 100 of the present embodiment are summarized as follows.

The placement part 30 possessed by the load detector 100 of the present embodiment includes the main body 30M and the guide 30G which is swingable relative to the main body 30M about a horizontal axis. In a case that the rolling body such as the caster CT, etc., as the subject is introduced on the main body 30M, it is possible to use the slope SL having the forward end SLT brought into contact with the floor surface. Further, since the slope SL is constructed of the first plate part SL1 and the second plate part SL2 which is swingable (pivotable) and linearly movable with respect to the first plate part SL1, it is possible to move the second plate part SL2 as necessary to thereby change the position and orientation of the forward end SLT, thereby making it possible to adjust the slope SL to be in a state which is suitable for allowing the caster CT to run up thereonto. Accordingly, the caster CT which may be arranged in various aspects (manners) with respect to the placement part 30 can be easily guided onto the slope SL, regardless of the variety of arrangement of the caster CT.

In the placement part 30 possessed by the load detector 100 of the present embodiment, in a case that the rolling body such as the caster CT, etc., as the subject is caused to move on the main body 30M, the lever $LV_{30}$ of the guide 30G is pushed toward the main body 30M to thereby cause the guide 30G to rotate (swing), which in turn separates the forward end SLT of the slope SL from the floor surface F. The state wherein the slope SL is separated from the floor surface F is maintained as long as the rolling body is present on the main body 30M. Thus, in the load detection which is performed by placing the detection target on the main body 30M, there arises no measurement error which might otherwise be caused due to any contact between the guide 30G and the floor surface F.

In the placement part 30 provided on the load detector 100 of the present embodiment, a major part or portion of the load from the rolling body such as the caster CT, etc., is applied to the plate $P_{30}$, and only a part of the load from the rolling body such as the caster CT, etc., is applied to the guide 30G via the rectangular part RC of the lever $LV_{30}$. Owing to this configuration, it is possible to avoid any load from being applied to the swing axis $X_{30}$ over time, thereby preventing components or parts, such as the bosses B, the recessed holes c, etc., from being damaged. Note that it is desired to set the depth of the recess $R_{30}$ (the height of the upper surface of the plate $P_{30}$ relative to the bottom surface of the recess $R_{30}$) to be greater than the thickness of the lever $LV_{30}$. In such a case, a gap (clearance or backlash) is defined between the lower surface of the lever $LV_{30}$ and the bottom surface of the recess $R_{30}$, and thus the load from the rolling body such as the caster CT, etc., is applied only to the plate $P_{30}$, thereby making it possible to further reduce the load on the swing axis $X_{30}$.

In the load detector 100 of the first embodiment, the first arm AM1 and the second arm AM2 of the lever $LV_{30}$ of the guide 30G of the placement part 30 may be connected to the first plate part SL1 of the slope SL in the vicinity of the central portion in the longitudinal direction of the first plate part SL1. Further, any one of the first arm AM1 and the second arm AM2 may be omitted. The number of arm(s) and the arrangement thereof may be changed so that the rolling body placed on the placement part 30 does not apply an unnecessary load to the guide 30G via the arm(s).

In the load detector 100 of the first embodiment, it is allowable to use a placement part having the following shape, instead of using the placement part 30.

Figure 11:
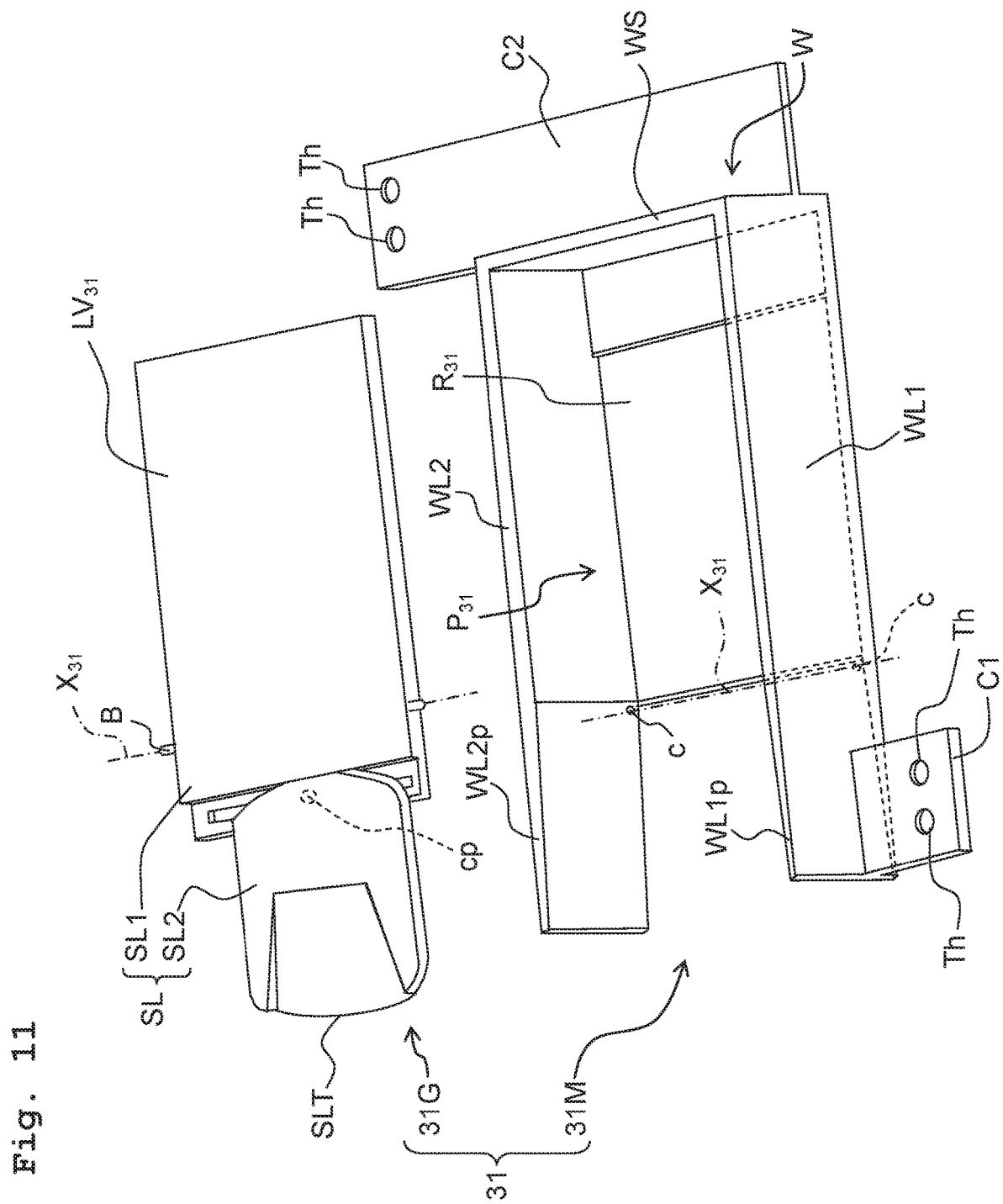
FIG. 11 is an exploded perspective view of a placement part according to a first modification of the present disclosure.

A placement part 31 of First Modification is depicted in FIG. 11. The placement part 31 of First Modification is identical to the placement part 30 of the first embodiment, except that a lever $LV_{31}$ of a guide 31G is a rectangular flat plate having no opening, that a recess $R_{31}$ having a rectangular shape in plan view is provided in a plate $P_{31}$ of a main body 31M instead of the recess $R_{30}$ having substantially the C-shape in plan view, and that the guide 31G is connected to the main body 31M by fitting bosses B provided in a slope SL into recess holes c provided in the wall W of the main body 31M such that the guide 31G is swingable about a rotary axis $X_{31}$.

Figure 12:
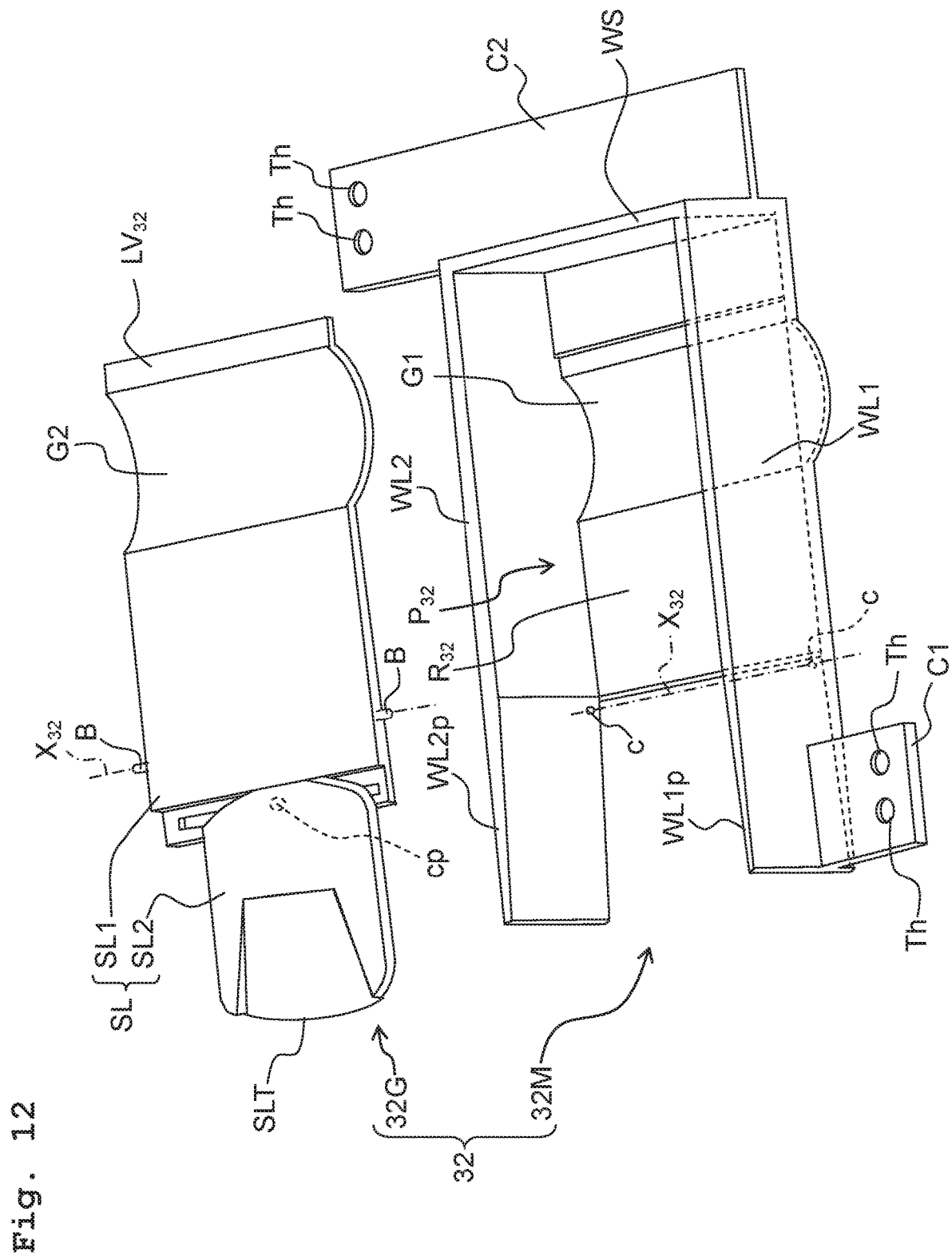
FIG. 12 is an exploded perspective view of a placement part according to a second modification of the present disclosure.

A placement part 32 of Second Modification is depicted in FIG. 12. The placement part 32 of Second Modification is identical to the placement part 31 of First Modification, except that a groove G1 having an arc-like shape and extending in the short-side direction of a plate $P_{32}$ of a main body 32M is provided in a recess $R_{32}$, which has a rectangular shape in plan view, of the plate $P_{32}$, and that a groove (movement regulation part) G2 which has an arc-like shape and of which shape and arrangement correspond to those of the groove G1, is provided in a lever $LV_{32}$ of a guide 32G. The caster CT placed on the plate $P_{32}$ is fitted into the groove G2 and thus any movement of the caster CT is regulated.

Figure 13:
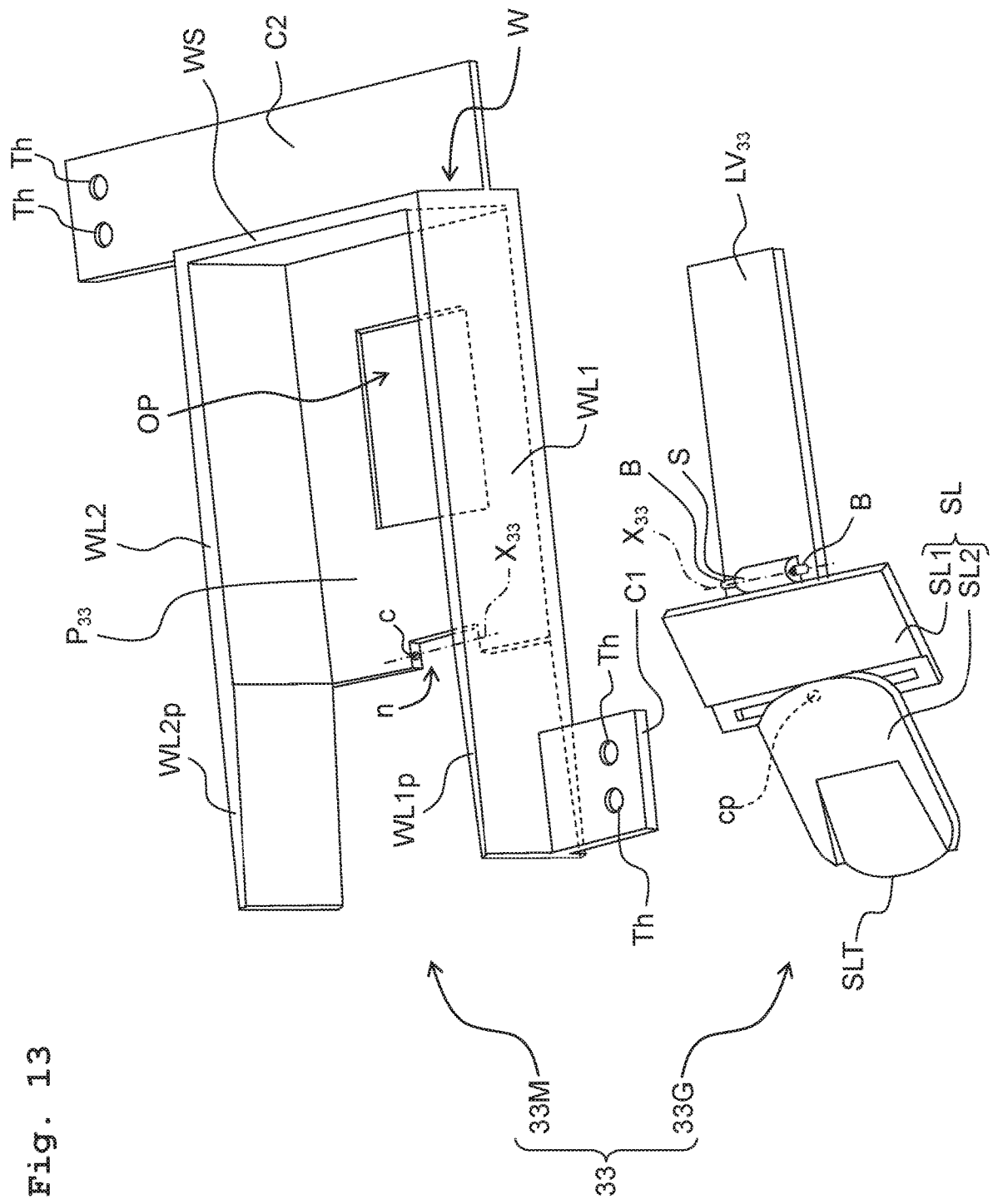
FIG. 13 is an exploded perspective view of a placement part according to a third modification of the present disclosure.

A placement part 33 of Third Modification is depicted in FIG. 13. The placement part 33 of Third Modification is mainly different from the placement part 30 in that a lever $LV_{33}$ of a guide 33G is a member which is rectangular in plan view and is disposed below a main body 33M, and that a plate $P_{33}$ of the main body 33M is a flat plate having an opening OP. The guide 33G is attached to the main body 33M so that the guide 33G is swingable about a swing axis $X_{33}$, by fitting bosses B protruding from an axis support part S provided on the lever $LV_{33}$ into a pair of recessed holes c of a notch n provided on the plate $P_{33}$ of the main body 33M, thereby arranging the lever $LV_{33}$ at a position below the opening OP. The caster CT placed on the plate $P_{33}$ is fitted into the opening OP to thereby push the lever $LV_{33}$ downward, which in turn separates the forward end SLT of a slope SL from the floor surface F.

Figure 14:
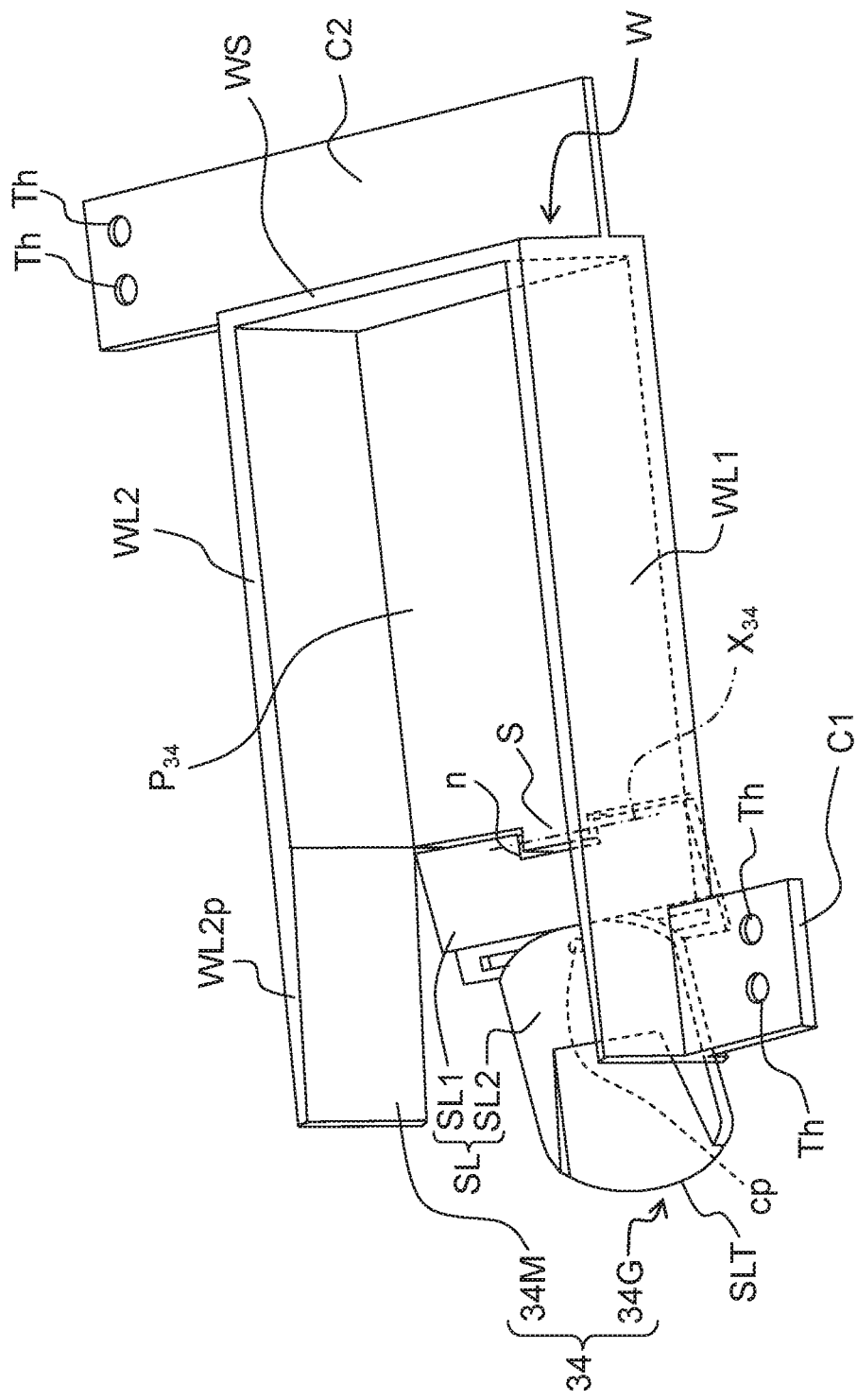
FIG. 14 is a perspective view of a placement part according to a fourth modification of the present disclosure.

A placement part 34 of Fourth Modification is depicted in FIG. 14. The placement part 34 of Fourth Modification is identical to the placement part 30, except that a guide 34G has no lever, no recess is formed on the upper surface of a plate $P_{34}$ of a main body 34M, and an urging (biasing) member which urges (biases) a forward end SLT of the slope SL upward is provided. Specifically, the urging member is a torsion spring(s) (not depicted in the drawings) that is/are disposed to surround bosses (not depicted in the drawings) protruding from an axis support part S. In a case that the caster CT is to be placed on the plate $P_{34}$, the caster CT pushes the forward end SLT downward to the floor surface F, and thereby causes the forward end SLT to make contact with the floor surface F.

Figure 15:
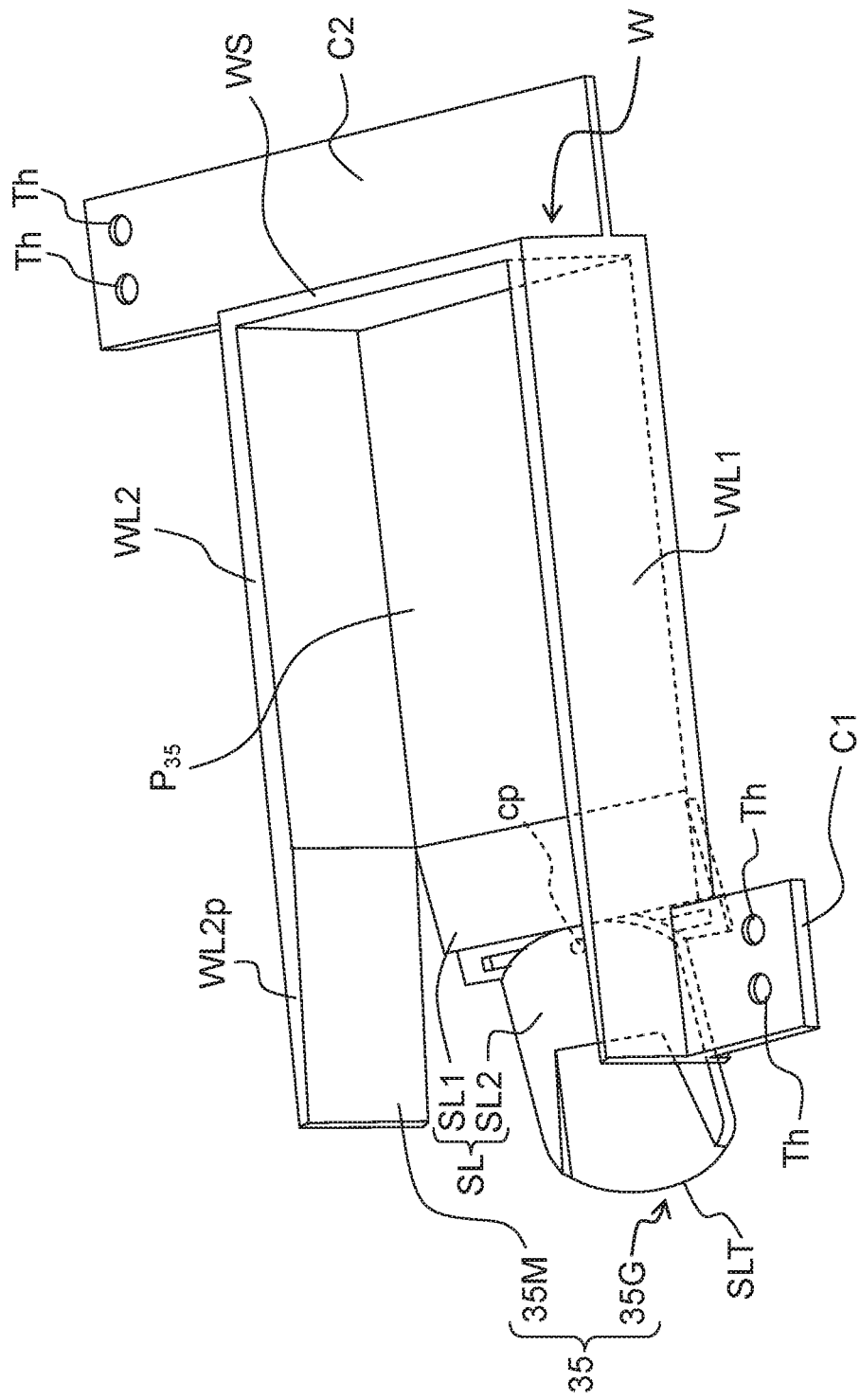
FIG. 15 is a perspective view of a placement part according to a fifth modification of the present disclosure.

A placement part 35 of Fifth Modification is depicted in FIG. 15. The placement part 35 of Fifth Modification is identical to the placement part 34 of Fourth Modification, except that a slope SL is integrally fixed to a plate $P_{35}$. In the load detector 100 having the placement part 35 of Fifth Modification, the forward end SLT of the slope SL is separated away from the floor surface F all the time while the caster CT is being moved onto the slope SL and while the caster CT is placed onto the plate $P_{35}$ (namely, while the load detection is being performed).

Second Embodiment

Figure 16:
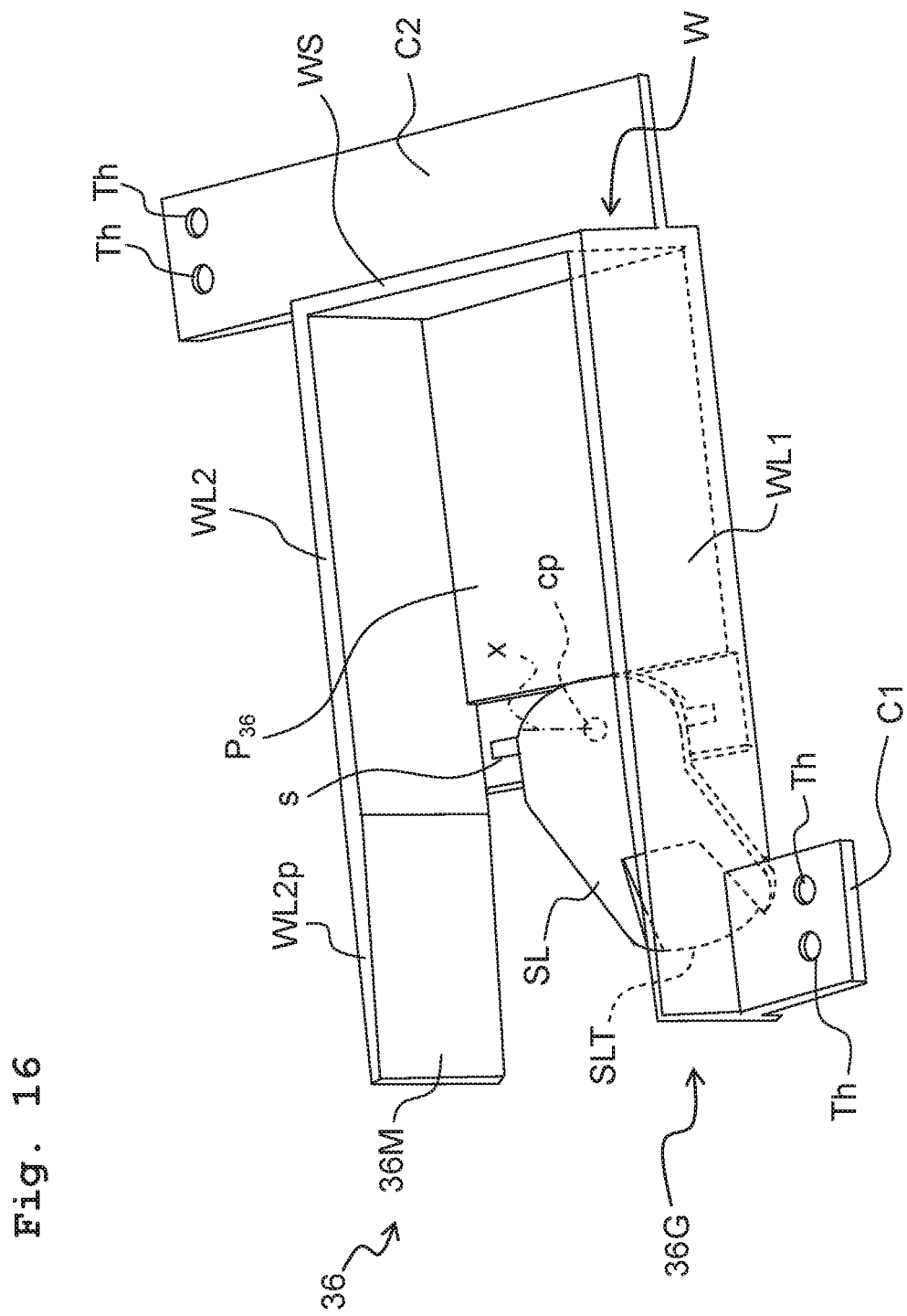
FIG. 16 is a perspective view of a placement part according to a second embodiment of the present disclosure.

Next, an explanation will be given about a second embodiment of the placement part provided on the load detector 100, with reference to FIG. 16. A placement part 36 of the second embodiment is identical to the placement part 34 of Fourth Modification, except that a slope SL is constructed of one piece of a curved plate (bent plate), and that the slope SL is connected to a main body 36M via a connecting pin cp provided on the lower surface of the slope SL and via a slit s provided on a plate $P_{36}$, as depicted in FIG. 16.

By allowing the connecting pin cp to slidably move along the slit s, the slope SL and the forward end SLT can be moved linearly along the width direction of the load detector 100 and of the plate $P_{36}$. Further, by allowing the connecting pin cp to rotate about the central axis x of the connecting pin cp, the slope SL and the forward end SLT can be swung about a central axis (first perpendicular axis) x which is perpendicular to the plate $P_{36}$.

The following modifications can be applied to each of the above-described embodiments and modifications.

In the first embodiment and each of the modifications, the second plate part SL2 may have a configuration wherein the second plate SL2 is divided into a front side plate part having the forward end SLT, and a rear side plate part. In such a case, the rear side plate part is connected with respect to the first plate part SL1 such that the rear side plate part is linearly movable with respect to the first plate part SL1, in the width direction of the load detector 100; and the front side plate part is connected with respect to the rear side plate part such that the front side plate part is swingable with respect to the rear side plate part, about an axis perpendicular to the rear side plate part. Also with such a configuration, the forward end SLT of the front side plate part is movable in the width direction with respect to the plate, and is swingable about the axis perpendicular to the second plate part SL2. In the second embodiment, it is allowable to adopt a configuration which is similar to the above-described modification regarding the first embodiment, etc., and in which the slope SL is further divided into a front side plate part having the forward end SLT and a rear side plate part.

In each of the respective embodiments and modifications, the slit s may be omitted. In such a case, the second plate part SL2 (the slope SL in the second embodiment) is consequently capable of performing only the swinging motion (pivot motion) about the central axis x of the connecting pin cp. Alternatively, it is also allowable to provide such a configuration that, for example, wherein the connecting pin cp is provided as two connecting pins cp which are provided in the width direction of the second plate part SL2 (the slope SL in the second embodiment), etc., thereby allowing the second plate part SL2 (the slope SL in the second embodiment) to be only slidably movable in the width direction of the load detector 100.

In each of the respective embodiments and modifications, the slit s may be changed into a groove which does not penetrate in the up-down direction. In such a case, a head portion of the connecting pin cp is held in the inside of the groove in such an aspect that may prevent the connecting pin cp from detaching and separating from the groove. As the method of connecting the second plate part SL2 (the slope SL in the second embodiment) in the swingable and linearly movable manner, it is allowable to adopt any method different from those as described above.

Further, in order to improve the slidability (sliding movability) between the first plate part SL and the second plate part SL2 (in the second embodiment, the slidability between the slope SL and the plate $P_{36}$), it is allowable to provide a liner formed of a lubricating material such as polytetrafluoroethylene (PTFE), etc., to an area or location in which the first plate part SL1 and the second plate part SL2 (in the second embodiment, the slope SL and the plate $P_{36}$) face and make contact with each other. Further, the connecting pin cp may be formed of a resin.

The shape, of a portion or part, of the slope SL on the side of the forward end SLT of the slope SL is not limited to the curved edge, and may be an edge having any shape such as linear-shaped edge, etc.

In each of the placement parts 30 to 36 of the above-described embodiments and modifications, it is not necessarily indispensable to arrange the first connection part C1 and the second connection part C2 on the diagonal line of (diagonally across) each of the plates $P_{30}$ to $P_{36}$, provided that the first connection part C1 and the second connection part C2 are arranged with each of the plates $P_{30}$ to $P_{36}$ intervening therebetween in the diagonal direction.

It is not necessarily indispensable to attach the first connection part C1 of each of the placement parts 30 to 36 of the above-described embodiments and modifications to a location in the vicinity of the free end 21s2 of the flexure element 21s of the first load cell 21. The first connection part C1 may be attached to the flexure element 21s of the first load cell 21 to a location on a side of the free end 21s2 relative to the central portion in the longitudinal direction of the flexure element 21s. Alternatively, the first connection part C1 may also be attached to the flexure element 21s of the first load cell 21 at any location on the side of the free end 21s2 relative to the side of the thin part(s) 21th. The second connection part C2 may also be attached to the flexure element 22s of the second load cell 22, in a similar manner as regarding the first connection part C1. The second connection part C2 may be attached to the flexure element 22s of the second load cell 22 at a location on the side of the free end 22s2 relative to the central portion in the longitudinal direction of the flexure element 22s.

It is allowable to use each of the placement parts 30 to 36 of the above-described embodiments and modifications, as, for example, a placement part of the load detector 900 of the single beam-type load cell, as depicted in FIG. 9. In such a case, for example, it is not necessary to provide the first connecting part C1 and the second connecting part C2 of the main body 30M to 36M of the placement parts 30 to 36, and a forward end of the load cell LC is attached to the short wall WS in a fixed manner. Further, it is also possible to use each of the placement parts 30 to 36 of the above-described embodiments and modifications, as a measurement pan of a load scale having three load cell sensors such as shown in Japanese Patent Application Laid-open No. 2005-300368.

It is allowable that each of the placement parts 30 to 36 of the above-described embodiments and modifications does not have the wall W.

In the placement parts 30, 31, 32 and 33 according to the first embodiment and the first to third modifications, the forward end SLT is caused to move to the position at which the forward end SLT is brought into contact with the floor surface F, due to the self-weight of the slope SL of each of the guides 30G, 31G, 32G and 33G. The present disclosure, however, is not limited to this configuration. An urging member (e.g., a torsion spring, a plate spring, a magnet, etc.) which urges the forward end SLT of the slope SL downward may be provided between the main body 30M, 31M, 32M or 33M and the guide 30G, 31G, 32G or 33G in each of the placement part 30, 31, 32 and 33. Alternatively, a weight may be attached to the slope SL, thereby moving the forward end SLT of the slope SL downward.

In the load detector 100, although the first load cell 21 and the second load cell 22 face each other in parallel, it is allowable that the first load cell 21 and the second load cell 22 face each other while defining an angle smaller than about 5° therebetween.

The load detector of each of the embodiments and modifications may be used with respect to any rolling body, instead of being used with respect to the castor CT.

Third Embodiment

Figure 17:
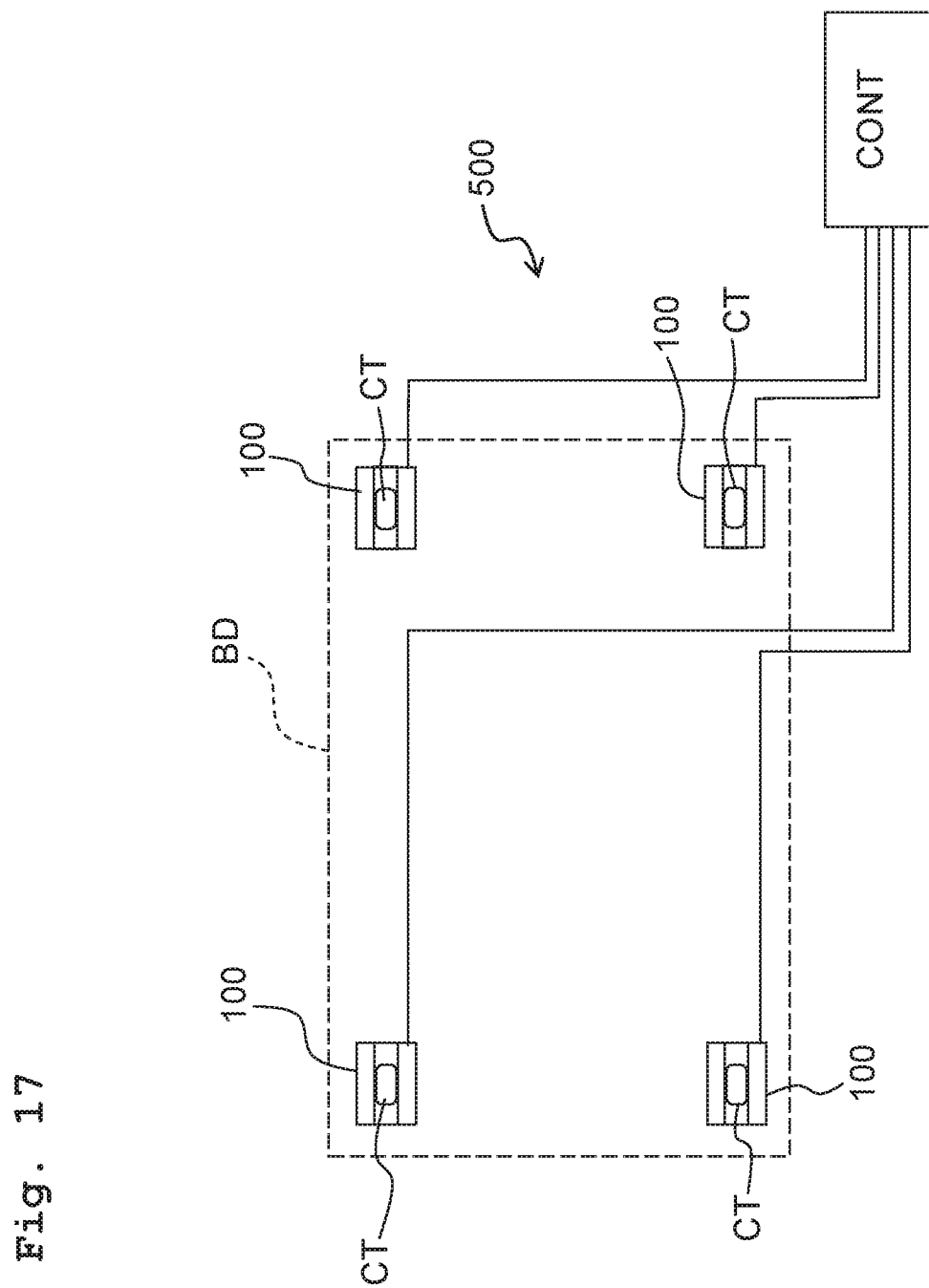
FIG. 17 is a schematic view depicting the configuration of a load detection system according to a third embodiment of the present disclosure.

Referring to FIG. 17, an explanation will be given about a load detection system 500 according to a third embodiment.

The load detection system 500 mainly includes four load detectors 100 and a controller CONT. The four load detectors 100 are connected to the controller CONT by wiring.

In a case that the load detection system 500 is used, four casters CT attached respectively to four legs of a bed BD are placed respectively on the placement parts 30 of the four load detectors 100 (FIG. 5B). This allows each of the four load detectors 100 to detect a part of the load, of a human subject on the bed BD, which is applied to each of the load detectors 100 via one of the legs, of the bed BD, corresponding thereto.

The controller CONT connected to the four load detectors 100 executes a load calculation processing of summing up the output from the first load cell 21 and the output from the second load cell 22 of each of the load detectors 100, and of subtracting a predetermined value corresponding to the position deviation error, and a load summing-up processing of summing up the loads detected by the respective load detectors 100. The controller CONT may further execute any other processing.

Since the load detection system of the present embodiment uses the load detector 100 including the placement part 30 according to the first embodiment, it is possible to obtain the same effects as those obtained by the placement part 30 according to the first embodiment. In particular, it is possible to easily perform an operation or work of placing four casters CT onto four load detectors 100, respectively, substantially simultaneously, by moving the second plate part SL2 depending on the position and the posture of each of the four casters CT.

Note that in the load detection system of the present embodiment, the number of the load detector 100 is not limited to or restricted by 4 (four); the number of the load detector 100 may be not more than 3 (three), or not less than 5 (five). Further, the load detector 100 may include the placement part 31, 32, 33, 34, 35, 36 of each of the second embodiment and the modifications, instead of including the placement part 30.

Note that in the load detection system of the present embodiment, the output from the load detector 100 may be transmitted to the controller CONT wirelessly, rather than via wiring. Further, the controller CONT may be connected to an indicator configured to indicate the load determined by the controller CONT, a notifying device or unit configured to perform a predetermined notification based on the determined load, etc.

The present invention is not limited to or restricted by the above-described embodiments, provided that the characteristics of the present invention are maintained. The present invention also includes any other embodiments which can be conceived in the range of the technical ideas of the present invention.

In the load detector of the above embodiments, the slope may include:

a first plate which is located at one side of the placement plate in an orthogonal direction orthogonal to the width direction, and a second plate which has the forward end and which is located at one side of the first plate in the orthogonal direction, the one side being opposite to a side at which the placement plate is located;

the first plate may be swingable about a swing axis which is provided on an end portion, of the first plate part, facing the placement plate, and which extends in the width direction of the placement plate; and the second plate may be connected to the first plate so that the forward end is swingable about the second perpendicular axis and/or is movable in the width direction.

In the load detector of the above embodiments, the second plate may be connected to the first plate so that the forward end is swingable about the second perpendicular axis and is movable in the width direction.

In the load detector of the above embodiments, the placement part may further include a lever which extends from the first plate to one side, of the swing axis, at which the placing plate is located, so as to be located above the placement plate.

In the load detector of the above embodiments, a recessed part may be provided on an upper surface of the placement plate, the recessed part being configured to accommodate the lever therein.

In the load detector of the above embodiments, the beam-type load cell may include a first beam-type load cell which is supported on a first support base in a cantilever manner to have a free end, and a second beam type load cell which is disposed to face the first beam type load cell and which is supported on a second support base in a cantilever manner to have a free end;

the placing part may include a first connection part connected to the first beam type load cell and a second connection part connected to the second beam type load cell, the placing part being disposed between the first beam-type load cell and the second beam-type load cell, the free end of the first beam type load cell and the free end of the second beam type load cell may face opposite directions to each other in a front-rear direction, and the first connection part of the placing part may be connected to the first beam-type load cell on a side of the free end of the first beam-type load cell and the second connection part of the placing part may be connected to the second beam-type load cell on a side of the free end of the second beam type load cell.

According to the load detector of the above embodiments, a subject can be easily placed onto the placement part.

The invention claimed is:

1. A load detector comprising:
   a beam-type load cell which is supported on a support base in a cantilever manner to have a free end; and
   a placement part which is connected to the beam-type load cell on a side of the free end of the beam-type load cell,
   wherein the placement part includes a placement plate onto which a subject is to be placed, and a slope which is configured to guide the subject from a floor surface onto the placement plate,
   a forward end of the slope is swingable about a first perpendicular axis perpendicular to an upper surface of the placement plate or about a second perpendicular axis perpendicular to an upper surface of the slope, and/or is movable in a width direction of the placement plate, the slope is located at one side of the placement plate in an orthogonal direction orthogonal to the width direction, the orthogonal direction extending within the upper surface of the placement plate, and the first perpendicular axis is perpendicular to the width direction and the orthogonal direction.

2. The load detector according to claim 1, wherein the slope includes:

a first plate which is located at one side of the placement plate in the orthogonal direction, and a second plate which has the forward end and which is located at one side of the first plate in the orthogonal direction, the one side being opposite to a side at which the placement plate is located;

the first plate is swingable about a swing axis which is provided on an end portion, of the first plate, facing the placement plate, and which extends in the width direction of the placement plate; and the second plate is connected to the first plate so that the forward end is swingable about the second perpendicular axis and/or is movable in the width direction.

3. The load detector according to claim 2, wherein the second plate is connected to the first plate so that the forward end is swingable about the second perpendicular axis and is movable in the width direction.

4. The load detector according to claim 3, wherein the placement part further includes a lever which extends from the first plate to one side, of the swing axis, at which the placement plate is located, so as to be located above the placement plate.

5. The load detector according to claim 4, wherein a recessed part is provided on the upper surface of the placement plate, the recessed part being configured to accommodate the lever therein.

6. The load detector according to claim 1, wherein the beam-type load cell includes a first beam-type load cell which is supported on a first support base in a cantilever manner to have a free end, and a second beam type load cell which is disposed to face the first beam type load cell and which is supported on a second support base in a cantilever manner to have a free end;

the placement part includes a first connection part connected to the first beam type load cell and a second connection part connected to the second beam type load cell, the placement part being disposed between the first beam-type load cell and the second beam-type load cell, the free end of the first beam type load cell and the free end of the second beam type load cell face opposite directions to each other in a direction along which the first beam-type load cell extends, and the first connection part of the placement part is connected to the first beam-type load cell on a side of the free end of the first beam-type load cell and the second connection part of the placement part is connected to the second beam-type load cell on a side of the free end of the second beam type load cell.

7. A load detection system configured to detect a load of a human subject on a bed, the system comprising:

a plurality of load detectors each of which is the load detector as defined in claim 1, each of the plurality of load detectors being disposed under each of a respective leg of the bed; and a controller which is connected to the plurality of load detectors and which is configured to calculate the load of the human subject based on an output of the load detectors.

8. A load detector comprising:

a beam-type load cell which is supported on a support base in a cantilever manner; and a placement part which is connected to the beam-type load cell, wherein the placement part includes a placement plate onto which a subject is to be placed, and a slope which is configured to guide the subject from a floor surface onto the placement plate, a forward end of the slope is swingable about a first perpendicular axis perpendicular to the placement plate or a second perpendicular axis perpendicular to the slope, and/or is movable in a width direction of the placement plate, the slope includes:

a first plate which is located at one side of the placement plate in an orthogonal direction orthogonal to the width direction, the orthogonal direction extending within a surface of the placement plate, and a second plate which has the forward end and which is located at one side of the first plate in the orthogonal direction, the one side being opposite to a side at which the placement plate is located, the first plate is swingable about a swing axis which is provided on an end portion of the first plate, facing the placement plate, and which extends in the width direction of the placement plate; and the second plate is connected to the first plate so that the forward end is swingable about the second perpendicular axis and/or is movable in the width direction.

9. The load detector according to claim 8, wherein the second plate is connected to the first plate so that the forward end is swingable about the second perpendicular axis and is movable in the width direction.

10. The load detector according to claim 9, wherein the placement part further includes a lever which extends from the first plate to one side, of the swing axis, at which the placement plate is located, so as to be located above the placement plate.

11. The load detector according to claim 10, wherein a recessed part is provided on an upper surface of the placement plate, the recessed part being configured to accommodate the lever therein.

* * * * *